US009858455B2

(12) United States Patent
Sajadi et al.

(10) Patent No.: US 9,858,455 B2
(45) Date of Patent: *Jan. 2, 2018

(54) SYSTEM AND METHOD FOR INTERACTIVE USER-DIRECTED INTERFACING BETWEEN HANDHELD DEVICES AND RFID MEDIA

(75) Inventors: Ali M. Sajadi, Washington, DC (US); David Carrott, Bristow, VA (US); Mohamad Reza M. Sajadi, Hunt Valley, MD (US)

(73) Assignee: Q STREET, LLC, Washington, DC (US)

( * ) Notice: Subject to any disclaimer, the term of this patent is extended or adjusted under 35 U.S.C. 154(b) by 351 days.

This patent is subject to a terminal disclaimer.

(21) Appl. No.: 13/819,650

(22) PCT Filed: Aug. 24, 2011

(86) PCT No.: PCT/US2011/001482
§ 371 (c)(1),
(2), (4) Date: May 13, 2013

(87) PCT Pub. No.: WO2012/026977
PCT Pub. Date: Mar. 1, 2012

(65) Prior Publication Data
US 2013/0229265 A1 Sep. 5, 2013

Related U.S. Application Data

(63) Continuation-in-part of application No. 12/901,430, filed on Oct. 8, 2010, now Pat. No. 8,068,011, which
(Continued)

(51) Int. Cl.
*H04Q 5/22* (2006.01)
*G06K 7/10* (2006.01)
(Continued)

(52) U.S. Cl.
CPC ...... *G06K 7/10297* (2013.01); *H04M 1/7253* (2013.01); *H04W 4/00* (2013.01); *H04M 2250/04* (2013.01)

(58) Field of Classification Search
CPC ............ G06K 7/10297; H04M 1/7253; H04M 2250/04; H04W 4/00
(Continued)

(56) References Cited

U.S. PATENT DOCUMENTS 4,688,026 A * 8/1987 Scribner et al. .............. 235/385
5,628,204 A 5/1997 Shanaberger
(Continued)

FOREIGN PATENT DOCUMENTS

EP 1314299 B1 11/2004
EP 1501038 A1 1/2005
(Continued)

OTHER PUBLICATIONS

International Search Report issued in PCT/US2011/001482 dated Jun. 3, 2013.

*Primary Examiner* — Edwin Holloway, III
(74) *Attorney, Agent, or Firm* — Sean S. Wooden; Andrews Kurth Kenyon LLP

(57) ABSTRACT

Systems and methods for interactively interfacing handheld devices and RFID media are described. A method for interactively interfacing HHDs and RFID media. The method includes starting an application on a HHD for interfacing with RFID media, the HHD including a RFID reader, receiving user input relating to the storing of commands or messages of RFID media, creating one or more commands or messages based on the received user input, and storing the one or more commands or messages on a RFID media using the RFID reader.

24 Claims, 5 Drawing Sheets

Related U.S. Application Data is a continuation-in-part of application No. 13/239,685, filed on Sep. 22, 2011, now Pat. No. 8,395,486, which is a continuation of application No. 12/901,430, filed on Oct. 8, 2010, now Pat. No. 8,068,011.

(60) Provisional application No. 61/377,728, filed on Aug. 27, 2010.

(51) Int. Cl.
*H04M 1/725* (2006.01)
*H04W 4/00* (2009.01)

(58) Field of Classification Search
USPC ...... 340/10.1, 10.3, 10.4, 10.5, 572.4, 13.26
See application file for complete search history.

(56) References Cited

U.S. PATENT DOCUMENTS

| | | | |
|---|---|---|---|
| 5,732,401 | A | 3/1998 | Conway |
| 5,837,983 | A | 11/1998 | Actis et al. |
| 5,886,634 | A | 3/1999 | Muhme |
| 5,938,726 | A | 8/1999 | Rebner et al. |
| 5,993,393 | A | 11/1999 | Ryan et al. |
| 6,285,282 | B1 | 9/2001 | Dorenbosch et al. |
| 6,297,727 | B1 | 10/2001 | Nelson, Jr. |
| 6,327,576 | B1 | 12/2001 | Ogasawara |
| 6,545,614 | B1 | 4/2003 | Kasai |
| 6,563,430 | B1 * | 5/2003 | Kemink et al. ............ 340/8.1 |
| 6,609,656 | B1 | 8/2003 | Elledge |
| 6,671,646 | B2 | 12/2003 | Manegold et al. |
| 6,677,852 | B1 * | 1/2004 | Landt ............... G06K 7/0008 235/375 |
| 6,693,539 | B2 | 2/2004 | Bowers et al. |
| 6,783,060 | B2 | 8/2004 | Marappan |
| 6,993,393 | B2 | 1/2006 | Von Arx et al. |
| 7,047,159 | B2 | 5/2006 | Muehl et al. |
| 7,060,030 | B2 | 6/2006 | Von Arx et al. |
| 7,076,255 | B2 | 7/2006 | Parupudi et al. |
| 7,119,659 | B2 | 10/2006 | Bonalle et al. |
| 7,128,274 | B2 | 10/2006 | Kelley et al. |
| 7,155,305 | B2 | 12/2006 | Hayes et al. |
| 7,172,112 | B2 | 2/2007 | Bonalle et al. |
| 7,178,729 | B2 | 2/2007 | Shaffer et al. |
| 7,180,422 | B2 | 2/2007 | Milenkovic et al. |
| 7,194,278 | B1 | 3/2007 | Cook |
| 7,213,766 | B2 | 5/2007 | Ryan et al. |
| 7,215,978 | B2 * | 5/2007 | Hasegawa ............ H04W 48/04 380/270 |
| 7,248,834 | B2 | 7/2007 | Matsuo et al. |
| 7,268,667 | B2 | 9/2007 | Beenau et al. |
| 7,268,668 | B2 | 9/2007 | Beenau et al. |
| 7,298,266 | B2 | 11/2007 | Forster |
| 7,333,062 | B2 | 2/2008 | Leizerovich et al. |
| 7,344,072 | B2 | 3/2008 | Gonzalez et al. |
| 7,346,061 | B2 | 3/2008 | Takayama et al. |
| 7,349,355 | B2 | 3/2008 | Sengupta et al. |
| 7,357,239 | B2 | 4/2008 | Schwarzli et al. |
| 7,366,552 | B2 | 4/2008 | Khoo |
| 7,375,616 | B2 | 5/2008 | Rowse et al. |
| 7,379,778 | B2 | 5/2008 | Hayes et al. |
| 7,392,061 | B2 | 6/2008 | Hurwitz et al. |
| 7,408,887 | B2 | 8/2008 | Sengupta et al. |
| 7,409,231 | B2 | 8/2008 | Oba et al. |
| 7,412,224 | B2 | 8/2008 | Kotola et al. |
| 7,413,124 | B2 | 8/2008 | Frank et al. |
| 7,420,466 | B2 | 9/2008 | Shafer |
| 7,427,926 | B2 | 9/2008 | Sinclair et al. |
| 7,440,743 | B2 | 10/2008 | Hara et al. |
| 7,455,218 | B2 | 10/2008 | Hara et al. |
| 7,463,133 | B2 | 12/2008 | Bonalle et al. |
| 7,468,702 | B2 | 12/2008 | Leizerovich et al. |
| 7,469,151 | B2 | 12/2008 | Khan et al. |
| 7,471,200 | B2 | 12/2008 | Otranen |
| 7,484,664 | B2 | 2/2009 | Shafer |
| 7,499,985 | B2 | 3/2009 | Linjama et al. |
| 7,500,750 | B2 | 3/2009 | Sabeta |
| 7,512,567 | B2 | 3/2009 | Bemmel et al. |
| 7,519,325 | B2 | 4/2009 | Wakim |
| 7,522,879 | B2 * | 4/2009 | Matsuo et al. ............ 455/41.1 |
| 7,522,882 | B2 | 4/2009 | Shibuya |
| 7,523,242 | B2 | 4/2009 | Lee et al. |
| 7,535,361 | B2 | 5/2009 | Doan et al. |
| 7,537,169 | B2 | 5/2009 | Gonzalez et al. |
| 7,540,408 | B2 | 6/2009 | Levine et al. |
| 7,541,930 | B2 | 6/2009 | Saarisalo et al. |
| 7,548,203 | B2 | 6/2009 | Kalliola et al. |
| 7,551,930 | B2 | 6/2009 | Lempio et al. |
| 7,565,108 | B2 | 7/2009 | Kotola et al. |
| 7,567,250 | B2 | 7/2009 | Hao et al. |
| 7,567,828 | B1 | 7/2009 | Burson |
| 7,570,164 | B2 | 8/2009 | Chakraborty et al. |
| 7,580,898 | B2 | 8/2009 | Brown et al. |
| 7,584,153 | B2 | 9/2009 | Brown et al. |
| 7,586,398 | B2 | 9/2009 | Huang et al. |
| 7,590,384 | B2 | 9/2009 | Dawidowsky |
| 7,590,409 | B2 | 9/2009 | Morita |
| 7,597,250 | B2 | 10/2009 | Finn |
| 7,606,533 | B2 | 10/2009 | Perttila et al. |
| 7,606,560 | B2 | 10/2009 | Labrou et al. |
| 7,616,095 | B2 | 11/2009 | Jones et al. |
| 7,616,117 | B2 | 11/2009 | Streeb et al. |
| 7,623,295 | B2 | 11/2009 | Sabeta |
| 7,640,271 | B2 | 12/2009 | Logan, Jr. |
| 7,646,297 | B2 | 1/2010 | Aaron |
| 7,646,316 | B2 | 1/2010 | Khoo |
| 7,647,024 | B2 | 1/2010 | Wang et al. |
| 7,651,535 | B2 | 1/2010 | Plos et al. |
| 7,652,578 | B2 | 1/2010 | Braun et al. |
| 7,653,397 | B2 | 1/2010 | Pernu et al. |
| 7,657,255 | B2 | 2/2010 | Abel et al. |
| 7,657,286 | B2 | 2/2010 | Kasslin et al. |
| 7,657,463 | B1 | 2/2010 | Shaw et al. |
| 7,664,532 | B2 | 2/2010 | Palin et al. |
| 7,667,646 | B2 | 2/2010 | Kalliola et al. |
| 7,668,560 | B2 | 2/2010 | Brothers |
| 7,668,565 | B2 | 2/2010 | Ylanen et al. |
| 7,668,785 | B1 | 2/2010 | Hammad |
| 7,672,297 | B2 | 3/2010 | Naqvi et al. |
| 7,680,691 | B2 * | 3/2010 | Kimball et al. ............ 705/22 |
| 7,683,781 | B2 | 3/2010 | Kantrowitz et al. |
| 7,688,181 | B2 | 3/2010 | Cargonja et al. |
| 7,688,208 | B2 | 3/2010 | Schuler et al. |
| 7,688,270 | B2 | 3/2010 | Tsushima |
| 7,693,229 | B2 | 4/2010 | Feher |
| 7,693,486 | B2 | 4/2010 | Kasslin et al. |
| 7,702,282 | B2 | 4/2010 | Sandegard et al. |
| 7,702,538 | B2 | 4/2010 | Rau et al. |
| 7,702,754 | B2 | 4/2010 | Dreiling |
| 7,703,691 | B2 | 4/2010 | Patel et al. |
| 7,708,194 | B2 | 5/2010 | Vawter |
| 7,708,401 | B2 | 5/2010 | Sabeta |
| 7,711,373 | B2 | 5/2010 | Kasslin et al. |
| 7,716,935 | B2 | 5/2010 | Kim et al. |
| 7,724,753 | B2 | 5/2010 | Naqvi et al. |
| 7,725,077 | B2 | 5/2010 | Jung et al. |
| 7,729,689 | B2 | 6/2010 | Chakraborty et al. |
| 7,729,722 | B2 | 6/2010 | Rofougaran et al. |
| 7,729,776 | B2 | 6/2010 | Von Arx et al. |
| 7,734,299 | B2 | 6/2010 | Panabaker et al. |
| 7,734,307 | B2 | 6/2010 | Dawidowsky |
| 7,735,740 | B2 | 6/2010 | Shafer |
| 7,738,494 | B2 | 6/2010 | Takayama |
| 7,738,569 | B2 | 6/2010 | Quinn et al. |
| 7,738,964 | B2 | 6/2010 | Von Arx et al. |
| 7,739,169 | B2 | 6/2010 | Hammad |
| 7,743,409 | B2 | 6/2010 | Gonzalez et al. |
| 7,746,215 | B1 | 6/2010 | Bishop |
| 7,747,797 | B2 | 6/2010 | Abraham et al. |
| 7,748,031 | B2 | 6/2010 | Gonzalez et al. |
| 7,748,618 | B2 | 7/2010 | Vawter |
| 7,748,636 | B2 | 7/2010 | Finn |
| 7,750,811 | B2 | 7/2010 | Puzio et al. |

(56) References Cited

U.S. PATENT DOCUMENTS

| | | |
|---|---|---|
| 7,756,467 B2 | 7/2010 | Bent et al. |
| 7,775,432 B2 | 8/2010 | Jalkanen et al. |
| 7,880,616 B2 | 2/2011 | Kanagala et al. |
| 7,953,402 B2 | 5/2011 | Carolan et al. |
| 7,978,082 B2 | 7/2011 | Braunstein |
| 8,068,011 B1* | 11/2011 | Sajadi ............... H04M 1/7253 340/10.4 |
| 8,395,486 B2* | 3/2013 | Sajadi ............... H04M 1/7253 340/10.4 |
| 2002/0008140 A1 | 1/2002 | Reynolds et al. |
| 2002/0167393 A1 | 11/2002 | Mabuchi et al. |
| 2002/0180588 A1 | 12/2002 | Erickson et al. |
| 2004/0070491 A1* | 4/2004 | Huang et al. ................ 340/10.5 |
| 2004/0176032 A1* | 9/2004 | Kotola et al. ................ 455/41.2 |
| 2004/0186768 A1 | 9/2004 | Wakim et al. |
| 2004/0228460 A1 | 11/2004 | Keramane |
| 2006/0145815 A1 | 7/2006 | Lanzieri et al. |
| 2006/0202803 A1 | 9/2006 | Yoon et al. |
| 2006/0279409 A1 | 12/2006 | Yang et al. |
| 2006/0293069 A1 | 12/2006 | Patel et al. |
| 2007/0032261 A1 | 2/2007 | Boyer et al. |
| 2007/0046434 A1 | 3/2007 | Chakraborty |
| 2007/0067325 A1* | 3/2007 | Weitzner ............... G06F 9/445 |
| 2007/0103303 A1 | 5/2007 | Shoarinejad |
| 2007/0178935 A1* | 8/2007 | Shim et al. ................ 455/552.1 |
| 2007/0296552 A1 | 12/2007 | Huang et al. |
| 2007/0296581 A1 | 12/2007 | Schnee et al. |
| 2008/0014966 A1 | 1/2008 | Chakraborty et al. |
| 2008/0057876 A1 | 3/2008 | Hsia et al. |
| 2008/0068131 A1* | 3/2008 | Cargonja et al. ............ 340/10.1 |
| 2008/0074263 A1* | 3/2008 | Rofougaran ............... 340/572.1 |
| 2008/0079549 A1 | 4/2008 | Yamada et al. |
| 2008/0094215 A1 | 4/2008 | Amador et al. |
| 2008/0129458 A1 | 6/2008 | Twitchell |
| 2008/0160984 A1 | 7/2008 | Benes et al. |
| 2009/0028334 A1 | 1/2009 | Balabine et al. |
| 2009/0066484 A1 | 3/2009 | Mochizuki et al. |
| 2010/0078471 A1 | 4/2010 | Lin et al. |
| 2010/0078472 A1 | 4/2010 | Lin et al. |
| 2010/0078475 A1 | 4/2010 | Lin et al. |
| 2010/0081375 A1* | 4/2010 | Rosenblatt ............ G08C 17/02 455/41.1 |
| 2010/0081385 A1 | 4/2010 | Lin et al. |
| 2010/0082444 A1 | 4/2010 | Lin et al. |
| 2010/0082445 A1 | 4/2010 | Hodge et al. |
| 2010/0082448 A1 | 4/2010 | Lin et al. |
| 2010/0082481 A1 | 4/2010 | Lin et al. |
| 2010/0082485 A1 | 4/2010 | Lin et al. |
| 2010/0082489 A1 | 4/2010 | Lin et al. |
| 2010/0082784 A1 | 4/2010 | Rosenblatt et al. |
| 2010/0099354 A1 | 4/2010 | Johnson |
| 2010/0174599 A1 | 7/2010 | Rosenblatt et al. |
| 2010/0179857 A1 | 7/2010 | Kalaboukis et al. |
| 2010/0187307 A1 | 7/2010 | Phillips et al. |
| 2010/0280918 A1 | 11/2010 | Balent |
| 2011/0070837 A1 | 3/2011 | Griffin et al. |
| 2011/0162035 A1 | 6/2011 | King et al. |

FOREIGN PATENT DOCUMENTS

| | | | |
|---|---|---|---|
| EP | 1569386 A2 | 8/2005 | |
| EP | 1575183 A1 | 9/2005 | |
| EP | 1630712 A1 | 3/2006 | |
| EP | 1653632 A1 | 5/2006 | |
| EP | 1657944 A1 | 5/2006 | |
| EP | 1681778 A2 | 7/2006 | |
| EP | 1708405 A1 | 10/2006 | |
| EP | 1717963 A1 | 11/2006 | |
| EP | 1722310 A1 | 11/2006 | |
| EP | 1752915 A2 | 2/2007 | |
| EP | 1773080 A2 | 4/2007 | |
| EP | 1793531 A1 | 6/2007 | |
| EP | 1804475 A2 | 7/2007 | |
| EP | 1809056 A1 | 7/2007 | |
| EP | 1814239 A2 | 8/2007 | |
| EP | 1841178 A1 | 10/2007 | |
| EP | 1845632 A1 | 10/2007 | |
| EP | 1845694 A1 | 10/2007 | |
| EP | 1855230 A2 | 11/2007 | |
| EP | 1855483 A2 | 11/2007 | |
| EP | 1860586 A1 | 11/2007 | |
| EP | 1871135 A2 | 12/2007 | |
| EP | 1887459 A2 | 2/2008 | |
| EP | 1887460 A2 | 2/2008 | |
| EP | 1895443 A2 | 3/2008 | |
| EP | 1901086 A2 | 3/2008 | |
| EP | 1901203 A1 | 3/2008 | |
| EP | 1912180 A2 | 4/2008 | |
| EP | 1912339 A1 | 4/2008 | |
| EP | 1914631 A1 | 4/2008 | |
| EP | 1916810 A1 | 4/2008 | |
| EP | 1954008 A2 | 8/2008 | |
| EP | 1959332 A1 | 8/2008 | |
| EP | 1959619 A2 | 8/2008 | |
| EP | 1965522 A2 | 9/2008 | |
| EP | 1968266 A1 | 9/2008 | |
| EP | 1976055 A1 | 10/2008 | |
| EP | 1978665 A1 | 10/2008 | |
| EP | 1983491 A1 | 10/2008 | |
| EP | 1986340 A2 | 10/2008 | |
| EP | 1986395 A1 | 10/2008 | |
| EP | 1990942 A2 | 11/2008 | |
| EP | 1995668 A1 | 11/2008 | |
| EP | 2003573 A1 | 12/2008 | |
| EP | 2018000 A1 | 1/2009 | |
| EP | 2018017 A2 | 1/2009 | |
| EP | 2023675 A2 | 2/2009 | |
| EP | 2034428 A1 | 3/2009 | |
| EP | 2043070 A1 | 4/2009 | |
| EP | 2051179 A1 | 4/2009 | |
| EP | 2056246 A1 | 5/2009 | |
| EP | 2056261 A1 | 5/2009 | |
| EP | 2063378 A3 | 5/2009 | |
| EP | 2065728 A1 | 6/2009 | |
| EP | 2073183 A1 | 6/2009 | |
| EP | 2075921 A2 | 7/2009 | |
| EP | 2077518 A1 | 7/2009 | |
| EP | 2077652 A2 | 7/2009 | |
| EP | 2088748 A1 | 8/2009 | |
| EP | 1897231 B1 | 9/2009 | |
| EP | 2009139 A2 | 9/2009 | |
| EP | 2096591 | 9/2009 | |
| EP | 2098955 A1 | 9/2009 | |
| EP | 2104049 A1 | 9/2009 | |
| EP | 2105904 A1 | 9/2009 | |
| EP | 2106107 A1 | 9/2009 | |
| EP | 2106108 A1 | 9/2009 | |
| EP | 1787139 B1 | 10/2009 | |
| EP | 2120109 A2 | 11/2009 | |
| EP | 2120111 A2 | 11/2009 | |
| EP | 2120113 A2 | 11/2009 | |
| EP | 2120114 A2 | 11/2009 | |
| EP | 2120115 A2 | 11/2009 | |
| EP | 2120116 A1 | 11/2009 | |
| EP | 2124146 A1 | 11/2009 | |
| EP | 2128830 A1 | 12/2009 | |
| EP | 2161630 A2 | 3/2010 | |
| EP | 2161901 A1 | 3/2010 | |
| EP | 2164014 A1 | 3/2010 | |
| EP | 2169924 A1 | 3/2010 | |
| EP | 1829303 B1 | 4/2010 | |
| EP | 2173135 A2 | 4/2010 | |
| EP | 2180390 A2 | 4/2010 | |
| EP | 2192753 A1 | 6/2010 | |
| EP | 2192810 A2 | 6/2010 | |
| EP | 2194472 A1 | 6/2010 | |
| EP | 2196968 A1 | 6/2010 | |
| EP | 2199996 A1 | 6/2010 | |
| EP | 2207108 A1 | 7/2010 | |
| EP | 1976231 A1 | 10/2010 | |
| JP | 2004200840 | 7/2004 | |
| JP | 2004215225 | 7/2004 | |
| JP | 2004334453 | 11/2004 | |

(56) References Cited

FOREIGN PATENT DOCUMENTS

| | | |
|---|---|---|
| JP | 2005045557 | 2/2005 |
| JP | 2005168069 | 6/2005 |
| JP | 3695463 | 7/2005 |
| JP | 3695465 | 7/2005 |
| JP | 3695466 | 7/2005 |
| JP | 2005204331 | 7/2005 |
| JP | 2005210741 | 8/2005 |
| JP | 2005218127 | 8/2005 |
| JP | 2005159958 | 11/2005 |
| JP | 2005332018 | 12/2005 |
| JP | 2006074767 | 3/2006 |
| JP | 2006121339 | 5/2006 |
| JP | 2006211519 | 8/2006 |
| JP | 2007081551 | 3/2007 |
| JP | 2007081621 | 3/2007 |
| JP | 2007150984 | 6/2007 |
| JP | 2008134735 | 6/2008 |
| JP | 2008165791 | 7/2008 |
| JP | 2008252883 | 10/2008 |
| JP | 2008259200 | 10/2008 |
| JP | 2008262362 | 10/2008 |
| JP | 2008294976 | 12/2008 |
| JP | 2009038774 | 2/2009 |
| JP | 2009064316 | 3/2009 |
| JP | 2009100074 | 5/2009 |
| JP | 2009134393 | 6/2009 |
| JP | 2009147845 | 7/2009 |
| JP | 2009182902 | 8/2009 |
| JP | 2009237974 | 10/2009 |
| JP | 2009238225 | 10/2009 |
| JP | 2009239431 | 10/2009 |
| JP | 2009239567 | 10/2009 |
| JP | 2009260666 | 11/2009 |
| JP | 2009290869 | 12/2009 |
| JP | 2010011418 | 1/2010 |
| JP | 2010011419 | 1/2010 |
| JP | 2010011420 | 1/2010 |
| JP | 2010020453 | 1/2010 |
| JP | 2010049645 | 3/2010 |
| JP | 2010055603 | 3/2010 |
| JP | 2010056593 | 3/2010 |
| JP | 2010068106 | 3/2010 |
| WO | 9848396 | 10/1998 |
| WO | 013217 A1 | 2/2001 |
| WO | 2004077345 A1 | 9/2004 |
| WO | 20050091997 A2 | 10/2005 |
| WO | 2006023857 A1 | 3/2006 |
| WO | 2006027725 A1 | 3/2006 |
| WO | 2006035331 A1 | 4/2006 |
| WO | 2006053677 A1 | 5/2006 |
| WO | 2006085269 A1 | 8/2006 |
| WO | 2006086729 A1 | 8/2006 |
| WO | 2006095212 A1 | 9/2006 |
| WO | 2006097760 A1 | 9/2006 |
| WO | 2006100171 A1 | 9/2006 |
| WO | 2006102537 A2 | 9/2006 |
| WO | 2006111782 A1 | 10/2006 |
| WO | 2006138584 A2 | 12/2006 |
| WO | 2007002485 A2 | 1/2007 |
| WO | 2007012909 A1 | 2/2007 |
| WO | 2007017777 A2 | 2/2007 |
| WO | 2007020519 A1 | 2/2007 |
| WO | 2007034457 A1 | 3/2007 |
| WO | 2007037841 A2 | 4/2007 |
| WO | 2007046653 A1 | 4/2007 |
| WO | 2007048399 A1 | 5/2007 |
| WO | 2007052117 A1 | 5/2007 |
| WO | 2007060616 A2 | 5/2007 |
| WO | 2007068993 A1 | 6/2007 |
| WO | 2007076456 A2 | 7/2007 |
| WO | 2007082602 A1 | 7/2007 |
| WO | 2007082604 A1 | 7/2007 |
| WO | 2007082612 A1 | 7/2007 |
| WO | 2007099639 A1 | 9/2007 |
| WO | 2007101992 A1 | 9/2007 |
| WO | 2007104365 A1 | 9/2007 |
| WO | 2007112787 A1 | 10/2007 |
| WO | 2007121791 A1 | 11/2007 |
| WO | 2007122439 A1 | 11/2007 |
| WO | 2007124932 A2 | 11/2007 |
| WO | 2007124965 A1 | 11/2007 |
| WO | 2007127559 A2 | 11/2007 |
| WO | 2007129139 A1 | 11/2007 |
| WO | 2007146470 A2 | 12/2007 |
| WO | 2007147448 A1 | 12/2007 |
| WO | 2008005460 A2 | 1/2008 |
| WO | 2008005974 A2 | 1/2008 |
| WO | 2008007260 A2 | 1/2008 |
| WO | 2008009654 A2 | 1/2008 |
| WO | 2008014800 A1 | 2/2008 |
| WO | 2008021032 A2 | 2/2008 |
| WO | 2008026691 A1 | 3/2008 |
| WO | 2008027620 A1 | 3/2008 |
| WO | 2008027621 A1 | 3/2008 |
| WO | 2008031629 A1 | 3/2008 |
| WO | 2008033898 A2 | 3/2008 |
| WO | 2008034937 A1 | 3/2008 |
| WO | 2008039234 A1 | 4/2008 |
| WO | 2008039559 A1 | 4/2008 |
| WO | 2008039560 A1 | 4/2008 |
| WO | 2008042302 A2 | 4/2008 |
| WO | 2008042455 A2 | 4/2008 |
| WO | 2008045586 A1 | 4/2008 |
| WO | 2008048376 A1 | 4/2008 |
| WO | 2008065232 A1 | 6/2008 |
| WO | 2008067153 A2 | 6/2008 |
| WO | 2008082851 A1 | 7/2008 |
| WO | 2008087431 A1 | 7/2008 |
| WO | 2008087739 A1 | 7/2008 |
| WO | 2008098082 A2 | 8/2008 |
| WO | 2008103871 A1 | 8/2008 |
| WO | 2008103875 A1 | 8/2008 |
| WO | 2008103945 A1 | 8/2008 |
| WO | 2008103988 A2 | 8/2008 |
| WO | 2008103991 A2 | 8/2008 |
| WO | 2008113053 A1 | 9/2008 |
| WO | 2008127967 A3 | 10/2008 |
| WO | 2008128583 A1 | 10/2008 |
| WO | 2008147457 A1 | 12/2008 |
| WO | 2008147728 A1 | 12/2008 |
| WO | 2008152739 A1 | 12/2008 |
| WO | 2009002972 A2 | 12/2008 |
| WO | 2009003707 A1 | 1/2009 |
| WO | 2009013385 A1 | 1/2009 |
| WO | 2009018255 A2 | 2/2009 |
| WO | 2009021220 A1 | 2/2009 |
| WO | 2009026000 A1 | 2/2009 |
| WO | 2009036264 A1 | 3/2009 |
| WO | 2009039419 A1 | 3/2009 |
| WO | 2009045085 A1 | 4/2009 |
| WO | 2009057745 A1 | 5/2009 |
| WO | 2009058010 A1 | 5/2009 |
| WO | 2009058494 A1 | 5/2009 |
| WO | 2009059213 A2 | 5/2009 |
| WO | 2009062176 A2 | 5/2009 |
| WO | 2009063121 A1 | 5/2009 |
| WO | 2009064522 A1 | 5/2009 |
| WO | 200906997 A2 | 6/2009 |
| WO | 2009069989 A2 | 6/2009 |
| WO | 2009071734 A1 | 6/2009 |
| WO | 2009076030 A2 | 6/2009 |
| WO | 2009079330 A1 | 6/2009 |
| WO | 2009079385 A1 | 6/2009 |
| WO | 2009081337 A1 | 7/2009 |
| WO | 2009095048 A1 | 8/2009 |
| WO | 2009097215 A1 | 8/2009 |
| WO | 2009098646 A1 | 8/2009 |
| WO | 2009101534 A1 | 8/2009 |
| WO | 2009105115 A2 | 8/2009 |
| WO | 2009111419 A2 | 9/2009 |
| WO | 2009115115 A1 | 9/2009 |
| WO | 2009124790 A1 | 10/2009 |
| WO | 2009127267 A1 | 10/2009 |
| WO | 2009128032 A1 | 10/2009 |

(56) References Cited

FOREIGN PATENT DOCUMENTS

| | | |
|---|---|---|
| WO | 2009130796 A1 | 10/2009 |
| WO | 2009138554 A1 | 11/2009 |
| WO | 2009138559 A1 | 11/2009 |
| WO | 2009141751 A1 | 11/2009 |
| WO | 2009141773 A2 | 11/2009 |
| WO | 2009141805 A3 | 11/2009 |
| WO | 2009173757 A1 | 11/2009 |
| WO | 2009148289 A2 | 12/2009 |
| WO | 2009151833 A1 | 12/2009 |
| WO | 2009152833 A1 | 12/2009 |
| WO | 2009158569 A3 | 12/2009 |
| WO | 2010000462 A1 | 1/2010 |
| WO | 2010002497 A1 | 1/2010 |
| WO | 2010005228 A3 | 1/2010 |
| WO | 2010011670 A2 | 1/2010 |
| WO | 20100115055 A3 | 1/2010 |
| WO | 2010012129 A1 | 2/2010 |
| WO | 2010015995 A1 | 2/2010 |
| WO | 2010017237 A2 | 2/2010 |
| WO | 2010018483 A1 | 2/2010 |
| WO | 2010018486 A1 | 2/2010 |
| WO | 2010019668 A3 | 2/2010 |
| WO | 2010022642 A1 | 3/2010 |
| WO | 2010023298 A3 | 3/2010 |
| WO | 2010025157 A1 | 3/2010 |
| WO | 2010029446 A1 | 3/2010 |
| WO | 2010030403 A1 | 3/2010 |
| WO | 2010030415 A1 | 3/2010 |
| WO | 2010033967 A1 | 3/2010 |
| WO | 2010033968 A1 | 3/2010 |
| WO | 2010035256 A2 | 4/2010 |
| WO | 2010037218 A1 | 4/2010 |
| WO | 2010042560 A2 | 4/2010 |
| WO | 2010042977 A1 | 4/2010 |
| WO | 2010044912 A1 | 4/2010 |
| WO | 2010047849 A1 | 4/2010 |
| WO | 2010057390 A1 | 5/2010 |
| WO | 2010060118 A2 | 5/2010 |
| WO | 2010062077 A2 | 6/2010 |
| WO | 2010067222 A2 | 6/2010 |
| WO | 2010068063 A2 | 6/2010 |
| WO | 2010070539 A1 | 6/2010 |
| WO | 2010073732 A1 | 7/2010 |
| WO | 2010078616 A1 | 7/2010 |

\* cited by examiner

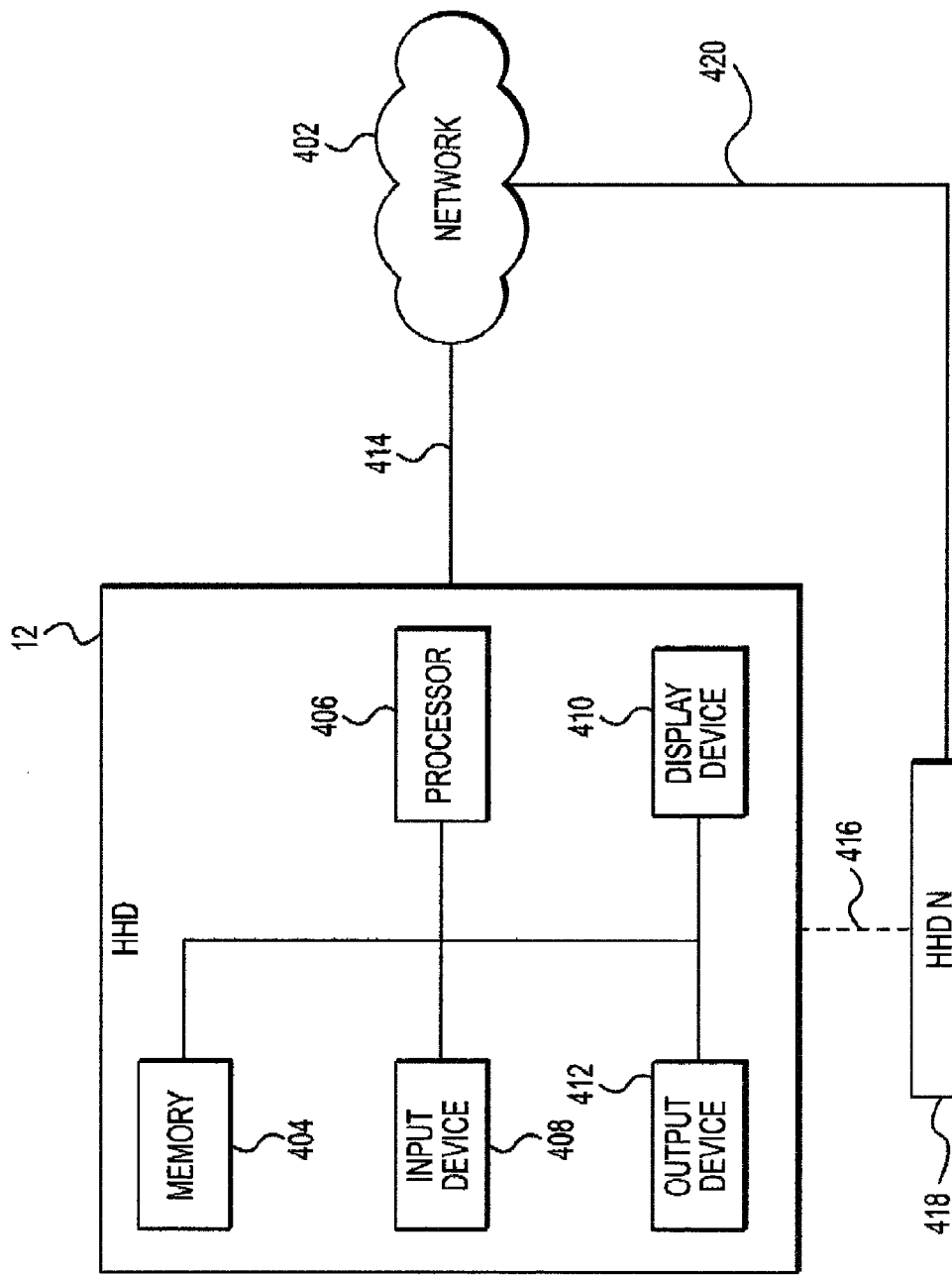

SYSTEM AND METHOD FOR INTERACTIVE USER-DIRECTED INTERFACING BETWEEN HANDHELD DEVICES AND RFID MEDIA

CROSS-REFERENCE TO RELATED APPLICATIONS

This application is a U.S. National Stage Application of PCT/US11/01481, entitled "System and Method for Interactive User-Directed Interfacing Between Handheld Devices and RFID," filed Aug. 24, 2011, which claims priority to, and is a continuation-in-part of, U.S. patent application Ser. No. 12/901,430, now U.S. Pat. No. 8,068,011, entitled "System and Method for Interactive User-Directed Interfacing Between Handheld Devices and RFID," filed Oct. 8, 2010, and which claims priority to U.S. Provisional Application Ser. No. 61/377,728, entitled "System and Method for Controlling and User Coding a Handheld Device, Storing Controls Internally or on an External Media and Triggering Such Controls in a Location-Based Context," filed Aug. 27, 2010. This application is also a continuation-in-part of U.S. patent application Ser. No. 13/239,685, entitled "System and Method for Interactive User-Directed Interfacing Between Handheld Devices and RFID," filed Sep. 22, 2011, which is a continuation of U.S. patent application Ser. No. 12/901,430, now U.S. Pat. No. 8,068,011, entitled "System and Method for Interactive User-Directed Interfacing Between Handheld Devices and RFID," filed Oct. 8, 2010, and which claims priority to U.S. Provisional Application Ser. No. 61/377,728, entitled "System and Method for Controlling and User Coding a Handheld Device, Storing Controls Internally or on an External Media and Triggering Such Controls in a Location-Based Context," filed Aug. 27, 2010. All of the above applications are hereby incorporated by reference.

BACKGROUND

Handheld devices ("HHDs"), including, for example, mobile devices, personal digital assistants, handheld computers, cameras and Smartphones, are devices that are usually hand held, often pocket-sized devices, with display screens, touch input and/or miniature keyboards. HHDs are most often used for communication purposes. HHDs are becoming ubiquitous and, for many, indispensable for daily lives and activities. As such, there has not been any way to have users be able to control specific preset functions on HHDs based on the HHDs location, or otherwise, without the skills necessary to use a software development kit (SDK) or programming tool set. In an ever more complicated world, there is a need for HHDs to function more seamlessly with their environment for the benefit of the user and for increasing the HHD's flexibility.

HHDs will become even more powerful and prevalent in the near future by being more flexible in function and in how they interact with the user's environment, thereby imparting more value to the end user. Utilizing Radio Frequency Identification (RFID) technology will enable handheld devices to achieve this flexibility and add value to the user's environment. Current HHD products available for RFIDs do not allow user directed commands or messages to be stored on the RFIDs and require interaction with a back-end server to perform functions.

SUMMARY

These and other disadvantages are overcome by a method for interactively interfacing HHDs and RFID media. The method includes starting an application on a HHD for interfacing with RFID media, the HHD including a RFID reader, receiving user input relating to the storing of commands or messages of RFID media, creating one or more commands or messages based on the received user input, and storing the one or more commands or messages on a RFID media using the RFID reader.

These and other disadvantages are also overcome by a method for interactively interfacing HHDs and RFID media. The method includes passing a HHD within range of a RFID media that includes one or more commands stored thereon, the HHD including a RFID reader, interrogating the RFID media with the RFID reader, receiving, on the HHD, the one or more commands from the RFID media, the HHD processing the one or more commands from the RFID media, and in response to the processing of the one or more commands, the HHD executing one or more functions.

These and other disadvantages are also overcome by a method for interactively interfacing handheld devices HHDs and RFID media. The method includes passing a HHD within range of a RFID media that includes one or more messages stored thereon, the HHD including a RFID reader, interrogating the RFID media with the RFID reader, receiving, on the HHD, the one or more messages from the RFID media, the HHD processing the one or more messages from the RFID media, the processing including determining if the one or more messages are intended for the HHD, and in response to the processing of the one or more messages, the HHD displaying the one or more messages.

These and other disadvantages are also overcome by a system for interactively interfacing handheld devices and RFID media. The system includes one or more RFID media capable of having commands and messages stored thereon and a HHD for interfacing with RFID media, the HHD including a RFID reader capable of reading and writing commands and messages from and to RFID media, a central application that includes instructions for receiving user input relating to storing of commands or messages of RFID media, creating one or more commands or messages based on the received input, and storing the one or more commands or messages on a RFID media.

These and other disadvantages are also overcome by a system for interactively interfacing handheld devices and RFID media. The system includes a RFID media capable of having messages stored thereon, the RFID media located on a consumable item and includes a message with information describing the consumable item, and a device capable of reading and writing messages from and to the RFID media, the device including a RFID reader capable of reading and writing messages from and to the RFID media, a processor, and a memory including a central application including instructions executable by the processor for processing messages read by the RFID reader from the RFID media, including the message with information describing the consumable item, creating a message that includes a time stamp and a unique identifier (ID) for the consumable item, and storing the created message on the RFID media on the consumable item.

BRIEF DESCRIPTION OF DRAWINGS

Embodiments are described with reference with to the following figures, in which like numerals refer to like elements.

FIG. 5 is a block diagram illustrating an embodiment of hardware components for implementing embodiments of system and method for interactively interfacing HHDs and RFID media.

DETAILED DESCRIPTION

Figure 1:
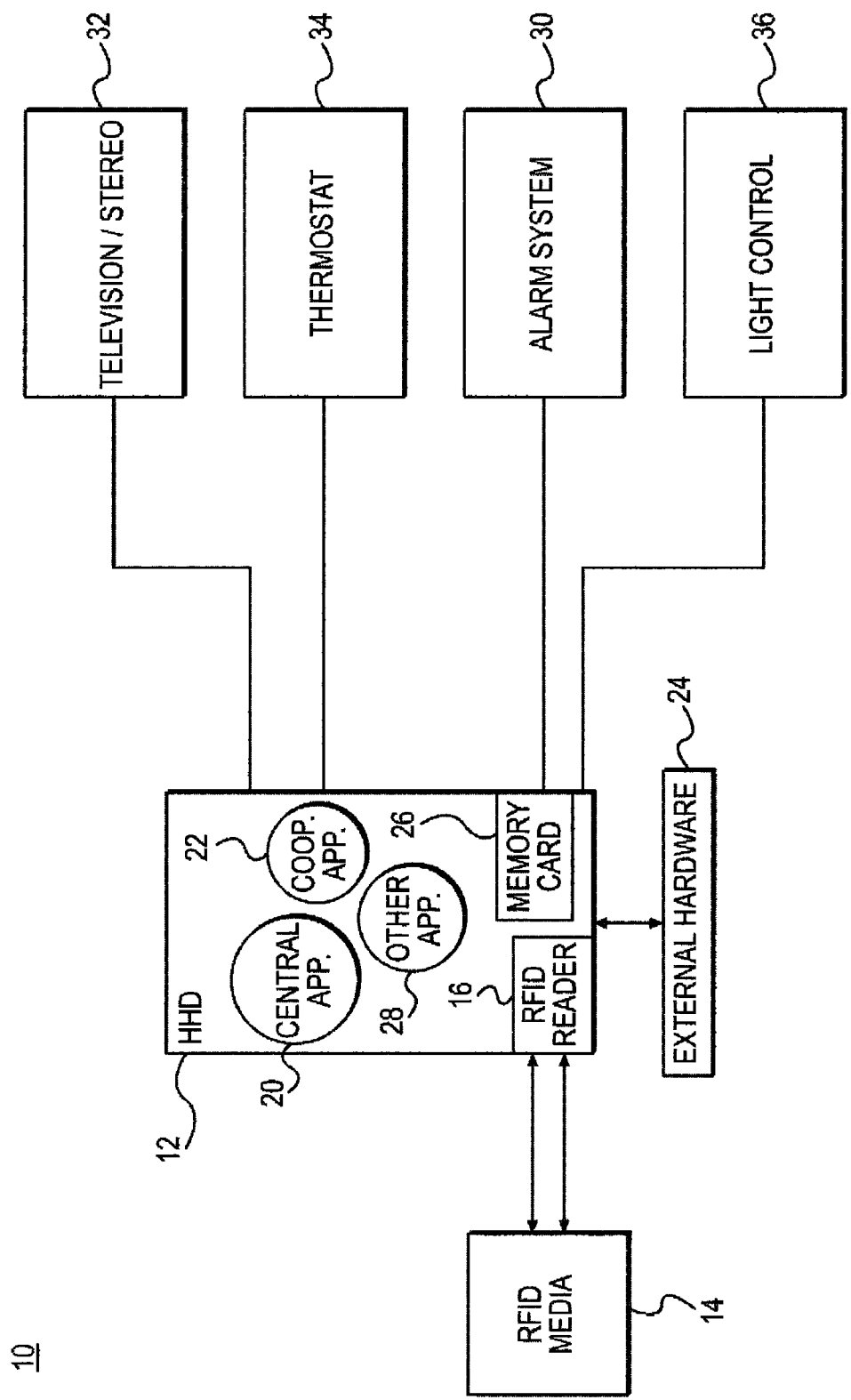
FIG. 1 is a block diagram illustrating an embodiment of a system for interactively interfacing HHDs and RFID media.

Described herein are embodiments of systems and methods for interactively interfacing handheld electronic devices (HHDs) and radio-frequency identification (RFID) media, such as Near Field Communication (NFC) or FeliCa media. Embodiments include systems and methods that code HHDs, control HHDs based on proximity to RFID media, store controls and information internally in HHDs and externally in RFID media, trigger such controls in a location-based context and transfer information to and from HHDs and RFID media. Embodiments are implemented as a HHD application in which a user may modify or change settings on their HHD or in their environment by or based on proximity to RFID media. Embodiments uniquely enable a user to store commands or code on RFID media to cause preset functions to occur on the user's HHD or in the user's environment by being in the presence of the user-modified RFID media.

When the term "user" is used throughout this specification, it is generally meant to refer to end-users that own and operate HHDs and that will use HHDs with the functionality described herein.

HHD users may use certain embodiments to control settings or functions of the users' HHDs; in embodiments, users may control settings or functions of the HHDs based on the location of use of the HHDs (such as in their car, office or home). In these embodiments, specific functions of the HHDs may be activated, or inactivated, (based on user input) based on the given location (e.g., a car). For example, in a car a user may wish to have the HHD's GPS and Bluetooth "ON", but the HHD's WiFi settings "OFF". In this example, the RFID reader on the HHD interacts with the RFID tag/sticker placed in the car and configures the HHD based on the unique settings previously programmed by the user. This makes the usage of the phone much more efficient for the user by only turning ON (or OFF, as the case may be) functions or settings the user has pre-specified for a specific location (i.e., at the location at which the RFID tag/sticker is placed). At the same time, valuable battery power of the phone is conserved by not using power intensive features such as WiFi that the user does not regularly use in those specific locations (e.g., in the car).

Embodiments are not limited to configuring the HHD to specific settings and programs based on the HHD's specific and unique location. Embodiments program HHDs (e.g., via an application) to transmit commands (over WiFi or other radiofrequency technology) to, for example, turn on and turn off lights, appliances, etc. For example, embodiments may program a HHD to turn on a television and room lights and turn off an alarm security system when the HHD enters a house (e.g., triggered by the HHD moving into range of certain RFID media).

In other embodiments, specific, unique data is transferred onto RFID tags of produce and other perishables to "time stamp" and give the perishables a unique code. The time stamp may be received and processed by an application to indicate whether the perishable has reached its expiration date or not. The unique code enables multiple units of the same perishable to be distinguished from one another (e.g., to distinguish one milk carton from three otherwise identical milk cartons in the same refrigerator). This embodiment is different than what was is currently described in the art in which an RFID reader simply reads information on the RFID tag that was placed on the produce item by the original manufacturer. There are limitations with this prior art method; one example being the fact that if one places two otherwise identical milk cartons in the refrigerator, the RFID tags on the milk cartons may cancel each other's signals and the reader would record zero milk cartons. To explain, in current RFID readers and tags, the communications protocol between the reader and the tags may use a scheme similar to slotted Aloha in which slots are provided for the tags to send text. Due to physical constraints, tags are unaware of other tags and, therefore, collisions may occur when multiple tags use the same slot for sending text. Since tags choose their slots randomly, collisions may be resolved in subsequent read iterations, and after a number of iterations, identification data from all tags may be retrieved. See, Harald Vogt, "Efficient Object Identification with Passive RFID Tags," Swiss Federal Institute of Technology (ETH), August 1998. Also there is no way to identify the two milk cartons apart (because they have the same ID tags) and therefore no way to keep track of each of them individually.

In this manner, embodiments may monitor items so that when an item is removed from, e.g., a refrigerator or closet, and not replaced, an RFID reader, e.g., in the refrigerator or closet, via peer-to-peer communication, transfers that information to a HHD (e.g., via the HHD's built-in RFID reader). This data may then be interfaced via an application to a user's shopping list, e.g., stored on the user's HHD (or to a family's shopping list stored in a family "cloud" storage) for shopping purposes or may be automatically transmitted by the HHD to the local produce store for home delivery. Further, when a user at a checkout line uses a HHD to pay for items (e.g., using RFID technology), the information of the items bought may be transferred to an application on the HHD. When receiving this information, the application may remove the item, e.g., a milk carton, from the user's shopping list and all other relevant shopping lists, e.g., via a cloud or other modalities such as peer-to-peer transfer.

In other embodiments, inventory of such items like water cooler water bottles and office supplies kept in supply closets may be tracked with RFID readers. For example, a water cooler may have a built in RFID reader that can interrogate RFID media on the water bottle and time stamp the RFID media of each water bottle uniquely and keep inventory. When the number of water bottles is low (e.g., set as an arbitrary number by a user), the RFID reader transmits that information to a HHD for processing. An application on the HHD may send that information to the water dispensing company for delivery or simply alert the user that the water bottle supply is low. Similarly, an RFID reader time-stamps office supplies, and when a particular office supply item runs low, transmits that information to a HHD for processing. An application on the HHD may send that information to a vendor for delivery or simply alert a user that the supply is low.

HHDs may include known and future mobile telephones, particularly, mobile smartphones, as well as other handheld electronic devices such as handheld computers, cameras and media devices. Such examples include the Apple iPhone™, the Google Android™ phones, and the Blackberry™. HHDs may also include larger devices such as iPads™, notebook, laptops and other mobile computers. In some embodiments of systems and methods described below, a non-mobile, fixed device, such as a RFID interrogator/reader with or without additional functionality may be used instead of a HHD.

The following refers to embodiments for changing the settings of the HHD automatically based on the location of the HHD.

With reference now to FIG. 1 shown is an embodiment of a system 10 for interactively interfacing HHDs and RFID media. System 10 includes a HHD 12 and one or more near-field communications ("NFC")-compatible RFID media 14. HHD 12 may be equipped with a RFID reader/interrogator 16. RFID reader/interrogator 16 may be, e.g., a near-field communications (NFC) reader, a Felicity Card ("FeliCa") reader or any similar technology RFID reader. The present application discusses NFC and NFC readers, but embodiments include, in general terms, RFID technology when mentioning these terms. RFID reader/interrogator 16 may be any device capable of reading information from and writing information to RFID media 14. When used herein, RFID reader/interrogator, RFID reader or RFID interrogator are synonymous. Such information, as described herein, may include commands, command sets, messages, etc. HHD 12 may also include a central application 20 that may implement methods described herein. Basic building blocks of embodiment of central application 20 include a command interpreter (to interpret commands and command text), a reader interpreter (to interpret messages from RFID reader/interrogator 16), one or more cooperative interfaces to other applications (to interface and communicate with cooperative applications 22), and memory for the command(s). It is understood that some HHD operating system providers incur restrictions, e.g., sandbox, on applications, these restrictions preventing cooperative applications or plug-ins for security concerns.

For example, central application 20 enables a user to create and transmit specific command text or sets of command text to an external media, such as RFID media 14 (as also noted below, central application 20 may also enable user to create and transmit specific message text or sets of message text to an external media, such as RFID media 14). The user may place the command or command set by writing through the application to the RFID media 14 for storage. The RFID media 14 storage may be a passive repository known and used in the industry (e.g., a passive RFID tag). This passive media it is not active when not coupled with the RFID reader/interrogator and is only active when it obtains energy from the RFID reader/interrogator when interrogated. In alternative embodiments, RFID media 14 may be an active RFID media (e.g., an active RFID tag). An active RFID media is active and energized through its own or a connected power source.

A unique aspect of embodiments described herein is that commands placed on RFID media 14 may be device-specific. The user may assemble, e.g., using the application, a complex set of commands/instructions specifically for the device and transmit the set for storage on the RFID media 14. The command set may be transmitted with a unique HHD identifier ("HHD ID") for the HHD 12 to the RFID media 14 and/or a separate user ID. This HHD ID (e.g., PIN, MEI, etc), user ID and/or a RFID media ID may be used to encrypt the command or command sets. In this manner the one or more commands or command sets are associated with the HHD 12, cannot be associated with another HHD or be altered by another HHD or other electronic device. Only the unique HHD 12 may decrypt and execute the command or command set. The storage of the RFID media 14 may be limited and may only allow a limited number of commands to be stored on the RFID media 14. However, the commands stored on the RFID media 14 may be from one or more HHDs so that different, unique sets of commands may be accessed and executed by different HHDs from the same RFID media 14. In embodiments, an HHD 12 has only the authority to restore, replace, or delete any commands with the same HHD ID.

With continuing reference to FIG. 1, in embodiments, HHD 12 includes an application that implements methods described herein, central application 20. In an embodiment, a central application 20 may instruct HHD 12, one or more cooperative applications 22, or hardware 24 interfaced to HHD 12 to perform functions. In embodiments, central application 20 so instructs by sending commands, e.g., code specific to the HHD 12, cooperative applications 22 and hardware 24, that HHD 12 executes to control functional features of HHD 12, cooperative applications 22, or hardware 24. The functional features may be functions of the HHD 12, cooperative applications 22, or hardware 24, as described herein or otherwise, such as internal functions for turning on/off WiFi reception, turning on/off GPS functions, causing HHD 12 to enter sleep mode, or external functions such as transmitting signals/commands to turn on/off lights 36, a television(s) 32, an alarm system(s) 30, a thermostat(s) 34, a computer(s), other appliances, etc. The central application 20 may send this commands as directed by a user or in response to commands received from RFID media 14, such commands being previously stored on RFID media 14 by central application 20 or otherwise. For example, a user may use central application 20 to create, transmit and store one or more commands or command sets, via RFID interrogator 16, on RFID media 14. Central application 20 may provide an interface for a user of HHD 12 to enter inputs, create or select commands and messages, and instruct storing of commands and messages on RFID media 14.

In embodiments, central application 20 is an "always-on" application that continuously or near-continuously runs, e.g., in the background, on HHD 12. Central application 20 may be a core application, pre-loaded onto HHD 12 or an application uploaded onto HHD 12 (e.g., after initial configuration and/or purchase of HHD 12). Central application 20 may be a stand-alone application or an integral part of the HHD 12 operating system. In other embodiments, central application 20 may be activated or "turned-on" to be used. Central application 20 may be turned on manually by HHD 12 user and/or automatically turned-on whenever HHD 12 detects RFID media 14. For example, HHD 12 may have command stored in memory that causes central application 20 to activate whenever RFID interrogator 16 detects an RFID media 14. Alternatively, RFID media 14 may include a command stored on the RFID media 14, either as a factory or otherwise pre-programming or as a command (e.g., user-generated) stored using embodiments described herein, that causes central application 20 to activate when RFID media 14 is interrogated and command is read from RFID media 14 to HHD 12.

With continuing reference to FIG. 1, when HHD 12 is coupled to RFID media 14, RFID interrogator 16 may receive the commands (e.g., specific to HHD 12) from RFID media 14. RFID interrogator 16 may provide the commands to central application 20 for processing. Central application 20 may execute the processed commands simply by passing them on or by issuing necessary code to, executing necessary code to cause, or otherwise instructing, HHD 14 (HHD processor), cooperative applications 22 or hardware 24 to perform the command functions. The commands stored on RFID media 14 may include commands or code for controlling and causing HHD 12, cooperative applications 22 and hardware 24 to execute functions dictated by commands.

In embodiments, commands written by central application 20 onto RFID media 14, or otherwise stored on RFID media 14, and read therefrom by RFID interrogator 16, may be written as command code of the HHD operating system. Accordingly, when RFID interrogator 16 reads commands from RFID media 14, the commands may be directly executed by the HHD operating system. An example of this may be commands stored on RFID media 14 that causes HHD 12 to turn on central application 20. Such commands are not limited to a specific operating system. For example, such command code may be for Android™ OS, Apple iOS™ or Windows 7 Mobile™. Only an HHD 12 with the corresponding operating system, however, will be able to execute such command code. In embodiments, HHD 12 may store multiple operating system command codes on RFID media 14; e.g., HHD 12 may store an iOS command as well as an Android OS command on an individual RFID media 14. The multiple operating system command codes may be for the same or different functions.

The commands and/or code may be stored by central application 20 inside the central application 20 or a cooperative application 22 in the HHD 12 permanent memory or internal memory media (e.g., a memory card) 26, or stored in an external media device, such as RFID media 14. Alternatively, the HHD 12 may include a built-in RFID media on which the commands and/or code (or messages) may be stored; in this manner, RFID interrogators on other devices (and RFID interrogator 16), including other HHDs, could read the commands and/or code (or messages) from RFID media on HHD 12. Communications allowing reading and writing to this external media can be through capabilities of HHD 12 (e.g., WiFi, Wireless, Bluetooth, etc) or by external hardware 24 (e.g., RFID reader, NFC, Felica, etc). As noted above, RFID media 14 may be, but is not limited to an active or passive RFID tag. Passive tags come in specific tag formats such as Mifare (ISO 14443A) and associated near-field communications (NFC, ISO 18092/2004) and FeliCa (Japan). The NFC protocol is compliant with the ISO 14443 HF air-interface standard that supports the Mifare and FeliCa protocols, which communicate at 13.56 MHz. There are currently two storage capacities available for passive RFID tags: 1 k and 4 k, respectively. Future RFID tags with larger capacities will work well with embodiments described herein. Although RFID media 14 is NFC-compatible, other RFID media may be used.

With continuing reference to FIG. 1, in embodiments, central application 20 may interface with and issue commands to cooperative applications 22, but not with other applications 28 that do not adhere to the cooperative interface with central application 20. Central application 20 may also interface with and issue commands to external hardware 24. External hardware may provide services not found in HHD 12. Some examples of external hardware 24 include RFID reader/interrogator (if HHD 12 does not include). Other external hardware 24 may include, e.g., bar code readers, biometric readers (iris, fingerprint, DNA, etc), blood toxicity meters, glucose meters, frequency scanners, etc. In embodiments, the code is a function or service that the central application 20 can execute to control cooperative application(s) 22, external hardware 24, or HHD 12.

The command sets may be text-based identifiers, for example two letters or more values, associated with a specific function and an action value. For example, command +GPS could mean turn on Global Positioning System (GPS) function of HHD 12 whereas −GPS would turn off the GPS function. In this manner, command sets may be similar to both low-level and high-level types of programming. Low-level programming uses text-based identifiers similar to those used in assembly language. Assembly language uses executable commands understood by a host programming application (e.g., the central application 20). Consequently, in using text-based identifiers, command sets of embodiments are like such low-level programming. However, like high-level programming, the text-based command sets may use natural language elements to make the commands user-friendly. Using natural language elements makes the commands simpler to use and the commands' functions more readily understandable. Such functions may be associated with programmable features/applications of HHD 12 made available through the user interface.

Another example would be a command to check the charge status (e.g., BAT) of HHD 12 and recommend placing the HHD 12 into Recharge Mode once inside the home or office. This would be similar to the manual user interface such as those found in the HHD tool set or settings. These could include random sequential change in personalization of the HHD's screen, skin, Wall paper, screen saver, multimedia or connection functions such as Blue tooth, WiFi, radio or external sync (e.g., ear piece) being "ON" or "OFF".

Commands created by a user on HHD 12 may be simple text-based commands, source code for simple or complex command sets written in a programming language that need to be compiled (into object code), machine code, operating system or application specific commands, or any other variety of commands.

In an embodiment of system 10, one or more RFID media 14 is located in a user's car. RFID media 14 can be loaded with a set of commands that are read by the user's HHD 12 to execute when within the proximity of the reader and NFC media 14. The command or set of commands are pre-stored to RFID media 14 by the user. These could be commands such as to turn on Bluetooth and GPS, but turn off WiFi, when HHD 12 is in the car.

Another embodiment of system 10, would include one or more RFID media 14 located at the front door of a user's house or at some other entry to the house. When the user's HHD 12 is in proximity to RFID media 14, the specific command set read by RFID interrogator 16 would turn off the Bluetooth and GPS functions of HHD 12 (conserving battery power) but turn on short range telecommunications antenna (e.g., WiFi). Other command sets might be household specific, such as if the house has a command set security function, HHD 12 could be told to inform the security company of the user's presence and make positive identification (e.g., Voice, PIN ID, Biometrics, etc) and disable the security alarm 30 of the house. Other commands might cause HHD 12 to transmit signals turning on television and/or stereo 32, adjust thermostat 34, and activate lights through lighting controls 36. In embodiments, as described above, central application 20 may receive and process commands from RFID interrogator 16 and issue code that causes HHD 12 or other component to perform functions per commands.

With continued reference to FIG. 1, another embodiment of system 10 includes one or more RFID media 14 located in certain locations, such as scenic areas that include commands to automatically set camera settings (such as shutter speed, exposure, etc) of HHD 12 (including, camera-equipped with a RFID reader 16) when HHD 12 is proximate to RFID media 14. The camera settings may be set to produce the most optimal photos in the location. Similarly, location may be sensitive areas such as a particular building or part of a building in which pictures are prohibited (e.g., government buildings, gym lockers). Consequently, RFID media 14 may include commands that, when HHD 12 is proximate to RFID media 14, cause camera features to be disabled upon entry and re-enabled upon exit. In embodiments, as described above, central application 20 may receive and process commands (e.g., initially received from RFID interrogator 16) and issue code that causes HHD 12 or other component to perform functions per commands.

In yet another embodiment of system 10, a user may store one or more messages on a specific RFID media 14. A message may be any type of textual communication that is intended for retrieval by one or more HHDs 12 that pass within interrogation range of RFID media 14. A message may include any amount or type of text (subject to storage limitations of RFID media 14), such as a single character, multiple characters, a word, multiple words, phrases, sentences, numbers, letters, etc. A message may be intended to be displayed (or otherwise output) to a recipient on recipient's HHD 12 or may be intended to only be internally processed by recipient's HHD 12. A message may be a reminder, note, comment, instructions, shopping list, or virtually anything the user intends. Indeed, the message may be intended for the user him/herself, e.g., as a note for later retrieval when next passing by RFID media 14. A message transmitted by HHD 12 and stored on RFID media 14 may be referred to as a "text drop," i.e., text dropped on RFID media 14 by HHD 12. Messages may convey virtually any information and may convey that information to HHD users or merely for internal processing by the HHD. Messages should not be confused with text messages that are transmitted from one handheld telecommunication device to another via a telecommunication network.

A message may be for any user's HHD 12 that passes proximate to RFID media 14 or only to one or more specific users' HHDs 12 that pass proximate to RFID media 14. Accordingly, messages may include one or more specific user or HHD IDs. The message may be encrypted or otherwise stored with IDs so that only HHDs 12 with necessary IDs can de-crypt or otherwise retrieve and open message. Such messages may be consider to be electronic "Post-It™" notes. For example, a wife can access software on her HHD 12 and write a specific message in the car in presence of RFID media 14 to remind her husband to pick up the dry cleaning when he is next in the car. HHD 12 stores the message on RFID media 14. When her husband is in the car and his HHD's 12 RFID reader 16 interrogates RFID media 14 in the car, the message may be transferred to his HHD 12 for his reading. In embodiments, as described above, central application 20 may enable user to create and store messages on RFID media 14, including storing necessary IDs and encrypting as described herein.

Yet another embodiment of system 10 would include one or more RFID media 14 in areas where certain radio frequency (RF) settings of a phone should be disabled, such as in an airplane or hospital rooms. Such RFID media 14 would include commands stored thereon to disable such settings. For example, when an HHD 12 is within the presence of such RFID media 14 on a plane, the HHD 12 may retrieve commands to turn off the WiFi, GPS, blue tooth, and other network functions of HHD 12. RFID media 14 may also include commands so that when passenger leaves the plane, or other similar area, the RF settings on HHD 12 revert back to original or normal settings (e.g., ON).

In certain embodiments of system 10, RFID media 14 is not installed in any fixed location, but may be portable and carried around by a user, on an item, and animal, a vehicle, or otherwise. Such RFID media 14 may have messages and/or commands stored thereon that convey information to HHDs 12 and/or other RFID readers, or instruct functions be performed, when the RFID media 14 is in proximity to the HHDs 12 or other RFID readers. In these embodiments, it is the presence of the RFID media 14 in the environment, rather than the presence of the HHD 12 in an environment that includes a fixed RFID media 14, that triggers the transfer of messages (e.g., information) or commands. Examples of such embodiments are described herein.

As noted herein, commands or command sets may be created on HHD 12 by user and stored on RFID media 14 and/or in HHD 12 memory. Likewise, as noted above, the commands or command sets (or messages) created on HHD 12 by user may be stored on other external media. For example, external media may be a device equipped with a transmitter that broadcasts the stored commands or command sets (or messages) after the user stores them on the external media. Such a device may upload the stored commands or command sets (or messages) to a cloud computing server or other networked device. Indeed, the external media may include instructions that cause the device to upload the stored commands or command sets (or messages) at a schedule time or times. The external media may be a device with a RFID interrogator with a more powerful transmitter that may transmit the commands and/or command sets (or messages) to RFID media from a greater range then the HHD 12 RFID interrogator 16. Such device may also, therefore, transmit commands or command sets (or messages) to multiple RFID media simultaneously.

Figure 2:
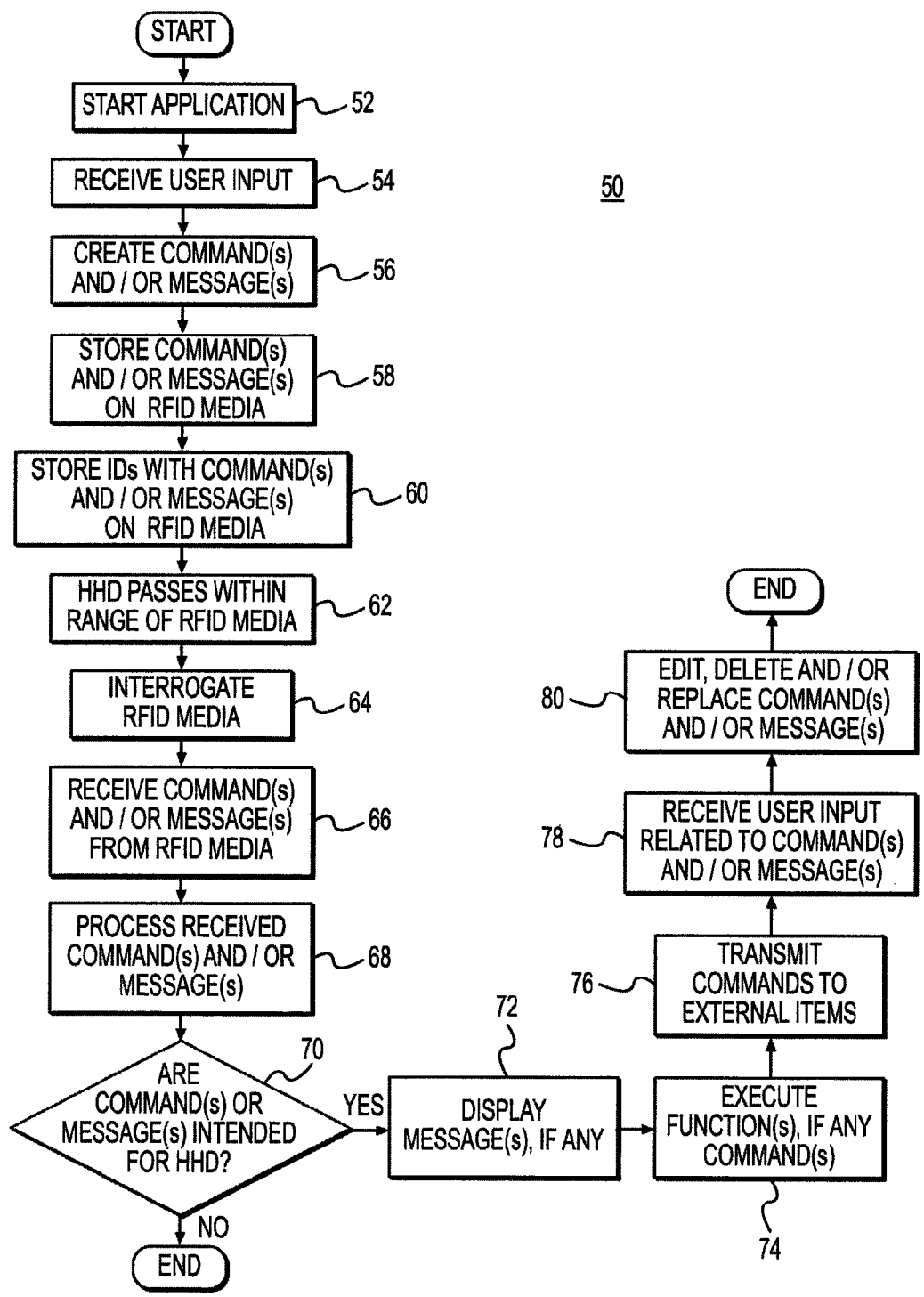
FIG. 2 is a flowchart illustrating an embodiment of a method for interactively interfacing HHDs and RFID media.

With reference now to FIG. 2, shown is a flowchart illustrating an embodiment of method 50 for interactively interfacing HHDs and RFID media. Method 50 starts application on HHD for interfacing with RFID media, block 52. Application may be central application described above with reference to FIG. 1. As noted above, application may provide interface for user input. Input, e.g., user input, is received through interface of application, block 54. Input may specify functions that a user wants executed when HHD passes near RFID media. Input may specify messages that user wants stored on RFID media for later retrieval by same or a different HHD. Functions may be, e.g., functions of HHD, applications on HHD (e.g., cooperative applications), or external hardware. Functions may be any of the examples provided herein, such as turning on or off features or settings on the HHD (e.g., WiFi, GPS, blue tooth, network functions, camera, internet access, etc.), causing HHD or application on HHD to transmit signals to turn on or off lights or appliances in environment, etc. Message may be any message intended for later retrieval by the same or another HHD, as described above. Alternatively, message may include time-stamp or other unique information intended to be stored on RFID (e.g., to keep track of inventory and inventory expiration dates), as described above.

Application may create one or more commands, command sets and/or messages per the input, block 56. As noted above, commands and command sets may be text-based identifiers, for example two letters or more values, associated with a specific function and an action value. The commands and command sets may cause HHD, applications or other hardware to execute the input functions. HHD (e.g., central application) may include instructions for translating the user-specified functions into the necessary commands or command sets to execute the functions. In embodiments, the instructions may include look-up tables identifying the code necessary to execute the functions. In other embodiments, received 54 user input may directly specify the commands or command sets (e.g., the code) to execute the functions. For example, as noted above, the commands and command sets may not need interpreting and may be simply executable by the HHD (e.g., by the central application). As discussed above, the commands and command sets may be like low-level programming, using text-based identifiers similar to those used in assembly language and executable by the host programming application (e.g., the central application). The command sets may use natural language elements to be more readily understood by the user.

When in range of the intended RFID media, application may transmit and store the one or more commands, command sets and/or messages to and on the intended RFID media, block 58. The application may transmit and store commands, command sets and/or messages to and on intended RFID media via the RFID reader/interrogator in any variety of manners known and understood by those of ordinary skill in the art. The application may transmit and store one or more user, HHD IDs and/or RFID ID, with associated commands, command sets and/or messages, to and on the intended RFID media, block 60. The application may transmit and store the ID(s) in the same step or a separate step with the commands, command sets and/or messages. Likewise, the ID(s) may be associated with the commands, command sets and/or messages on the HHD prior to transmitting or after transmitting on the RFID media. The storing 60 may include encrypting the commands, command sets and/or messages so that only the intended HHD and user may retrieve the commands, command sets and/or messages.

The above describes steps for storing commands, command sets and/or messages on an RFID. In embodiments, RFID media may have pre-stored commands, command sets and/or message. Such preset RFID media may include commands, command sets and/or messages that are stored on the RFID media during manufacturing, at a point of sale (e.g., a car dealership, grocery store, etc) or otherwise prior to installation of the RFID media at a specific location or on a specific item. Whether preset or stored by a user using embodiments described herein, commands, command sets and/or messages on RFID media may be later edited and may be read from RFID media.

With continuing reference to FIG. 2, in embodiment of method 50, HHD passes within range, and becomes proximate to, RFID media with command(s), command sets and/or messages stored thereon, block 62. RFID media is interrogated by RFID reader/interrogator on HHD, block 64. RFID reader/interrogator may interrogate RFID media in manner known to those of ordinary skill in the art. One or more commands, command sets, and/or messages are received from RFID media, block 66, and processed by HHD (e.g., by central application), block 68. As noted above, commands, command sets and messages may be specific to one or more HHDs. When stored on the RFID, the commands, command sets and messages may be stored with a user ID and/or HHD ID or even encrypted with such IDs. Consequently, processing 68 may include determining if command(s), command set(s) and/or message(s) are intended for HHD, block 70. Determining 70 may include decrypting the command(s), command set(s) and/or message(s).

If one or more messages are received 66 and determined 70 to be intended for HHD, the message(s) may be displayed (or otherwise output to user), block 72. For example, the message may be a message stored on the RFID media by another user for later retrieval by the current user (e.g., an electronic Post-It note, as described above). The message may be a secure or sensitive message or information that is encrypted and stored on the RFID media for retrieval only by a specific user using a specific HHD. The message may be double-encrypted, using known methods, with the user ID and the HHD ID and determining 70 may require the user to enter the user ID and/or a password to successfully decrypt the message (e.g., the user may enter such information through a display/interface provided by the central application). Alternatively, a message may simply be information that is intended to be stored or be internally processed by HHD or an application thereon. For example, if RFID media is, e.g., a RFID tag located on a grocery item or merchandise item on a shopping list, message may simply be information describing the item. The shopping list may be maintained by an application on HHD (e.g., central application or cooperative application) or elsewhere (e.g., home computer). Consequently, processing 68 may extract information and remove item from shopping list, or transmit information describing item to application maintaining shopping list for such removal. Further, a message may simply be information that is intended to be passed on to another device. Passing on this information may be done to indicate the presence of the HHD at the location of the RFID media.

Message may be displayed 72 on display of HHD. Alternatively, message may be converted to audio and output to the user through speakers of HHD. HHD (e.g., central application) may be set up by user to process and output the received 66 message per the user's preferences.

If one or more commands or command sets are received 66 and determined 70 to be intended for HHD, corresponding functions on HHD, cooperative application and/or hardware may be executed/performed, block 74. For example, such HHD settings as GPS and Bluetooth may be turned on while others such as WiFi may be turned off. Likewise, commands and/or command sets on the RFID media may instruct the HHD to transmit commands that affect the environment in which the RFID media and the HHD are located, or elsewhere. For example, HHD may transmit a command(s) to appliances, electronic equipment, light switches, thermostats, etc. (collectively referred here to as "external items"). Consequently, method 50 may transmit one or more commands to external items, block 76. The HHD may transmit such commands over WiFi, other radio frequencies and/or through a network connection, or other known means.

With continuing reference to FIG. 2, as noted above, commands, command sets and/or messages stored on RFID media may be edited. For example, after receiving a message intended for user, HHD may be used to delete the message and/or replace the message with a responsive message. Likewise, when HHD retrieves commands and/or command sets upon first passing in range of RFID media (e.g., on entering room or vehicle, etc.), HHD may alter commands and/or command sets so that, e.g., opposite functions are performed when HHD next passes in range of RFID media (e.g., on exiting room or vehicle). For example, if WiFi is turned off in HHD upon entering airplane, command may be altered to turn on WiFi upon exiting airplane. Likewise, in response to executing a command(s) or receiving a message(s), HHD may store a new command(s) and/or a new message(s) on the RFID media, including, e.g., a message(s) indicating that the command(s) and/or message(s) have been received and/or executed. Consequently, method 50 may receive user input or automated commands relating to retrieved command(s), command set(s) and/or message(s), block 78 and edit, delete and/or replace command(s), command set(s) and/or message(s) per same, block 80.

Figure 3:
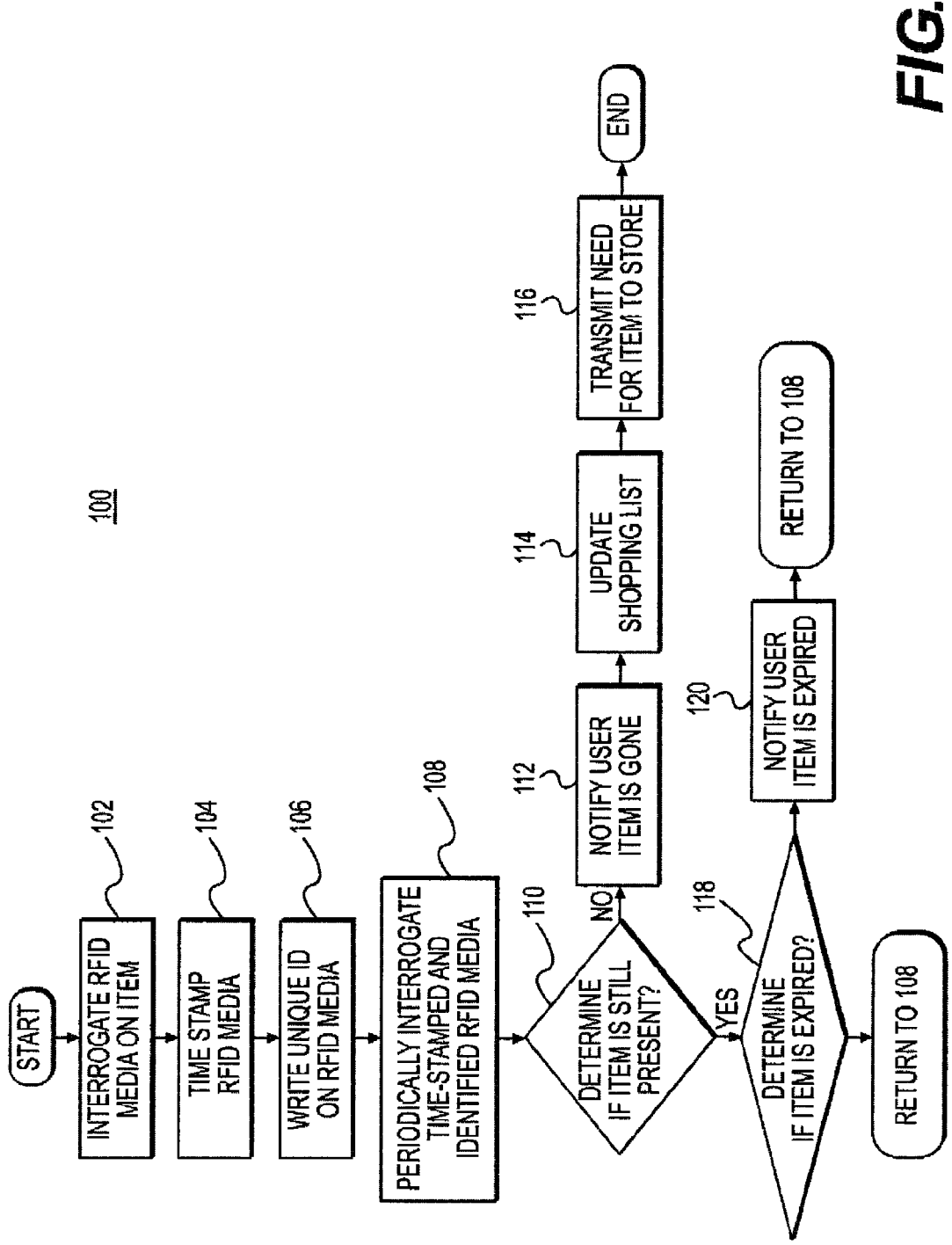
FIG. 3 is a flowchart illustrating an embodiment of a method for interactively interfacing HHDs and RFID media.

With reference now to FIG. 3, shown is a method 100 for interactively interfacing handheld device and RFID media. In method 100, a stand-alone RFID reader/interrogator interrogates RFID media on a consumable item and transfer the information regarding the item to HHD (e.g., to central application) for processing, block 102. RFID reader/interrogator (e.g., built-in, for example, a kitchen appliance such as a refrigerator) may transfer this information via peer-to-peer transfer (known in the art) to a HHD (e.g., to RFID reader/interrogator in HHD). In addition, RFID reader/interrogator may be WiFi enabled, so that it may connect via WiFi, ethernet or other connection to a HHD or otherwise through a network, and may be installed on or built-in, e.g., a refrigerator, freezer, pantry closet, cabinet, other closet or other location where consumable are stored. Consumable may be perishable grocery item, such as a carton or gallon of milk, or an office supply item, such as paper or pens. RFID media may be a RFID sticker or other attachable RFID tag. When interrogating 102 item, RFID reader/interrogator may retrieve information from RFID media describing the item, including information identifying the item and the item's expiration date. This information may be transmitted 102 to HHD. Central application, or other application on HHD, may keep track of item and its expiration date. RFID reader may transfer the information to HHD via peer-to-peer NFC transfer or otherwise over a network.

Alternatively, RFID reader/interrogator may be part of or connected to a computing device (e.g., with a processor, memory, transmitter, etc) that includes central application described above and/or is otherwise functionally capable of performing functions of HHD described above. Such computing device may be installed on or built-in to the, e.g., a refrigerator, pantry closet, cabinet, or other location where consumable is stored. In such an embodiment, RFID reader/interrogator interrogates 102 RFID media on a consumable item and simply transfers the information to the computing device. The computing device may be a HHD temporarily or permanently installed on, e.g., a refrigerator, pantry closet, cabinet, or other location where consumable is stored.

RFID reader/interrogator may time stamp the item's RFID media, block 104, and/or write a specific, unique identifier (e.g., an ID number) on the item's RFID media, block 106. RFID reader/interrogator may determine time from HHD or network. Likewise, unique identifier may be provided by HHD (e.g., by central application). Indeed, HHD (e.g., central application) may instruct RFID reader/interrogator to time-stamp 104 and write unique identifier on RFID media, block 106, e.g., in response to receiving information interrogated 102 from RFID media. Time-stamping 104 and/or uniquely identifying 106 an item's RFID media enables the item to be uniquely identified and tracked so that it is not confused or mistaken for another item of the same type.

With continuing reference to FIG. 3, RFID reader/interrogator may periodically interrogate time-stamped and/or uniquely identified item's RFID media and transfer information regarding the item to HHD (e.g., to central application) for processing, block 108. For example, RFID reader/interrogator built-in to refrigerator may interrogate any RFID media present in the refrigerator. If HHD (e.g., central application) determines that item is no longer present (i.e., item has been thrown out or used up), block 110, HHD may notify user (e.g., as described above), block 112, and update shopping list maintained on HHD or elsewhere (e.g., by central application), block 114. HHD (e.g., central application) may determine 110 that item is no longer present if RFID reader/interrogator fails to detect presence of item in repeated attempts over a set period of time (e.g., 30 minutes). For example, if RFID reader/interrogator does not successfully interrogate RFID media on previously identified item, HHD may determine 110 item is not present. The user may set the time through, e.g., central application interface. HHD (e.g., central application) may update 114 shopping list on other HHD's via peer-to-peer transfer or by transmitting the data via a cloud to another HHD or other computer. In certain embodiments, HHD (e.g., central application) may transmit need for item to shopping list maintained by store for a timed delivery service, block 116.

If item is determined 110 to still be present, HHD (e.g., central application) may determine whether item is past its expiration date (e.g., by comparing to expiration date transmitted 102 and stored by central application), block 118. If past its expiration date, HHD may notify user (e.g., through central application display, text message, e-mail, etc.) that item has expired and should be thrown out, block 120. If not expired, periodic interrogation 108 may continue.

It is noted that any computer running central or other application may also perform steps performed in method 100 by HHD. For example, RFID reader/interrogator may transfer 102 and 108 interrogated information to central application resident on home desktop or notebook computer. Such application may maintain shopping list and otherwise perform actions performed by central application on HHD as described above.

Figure 4:
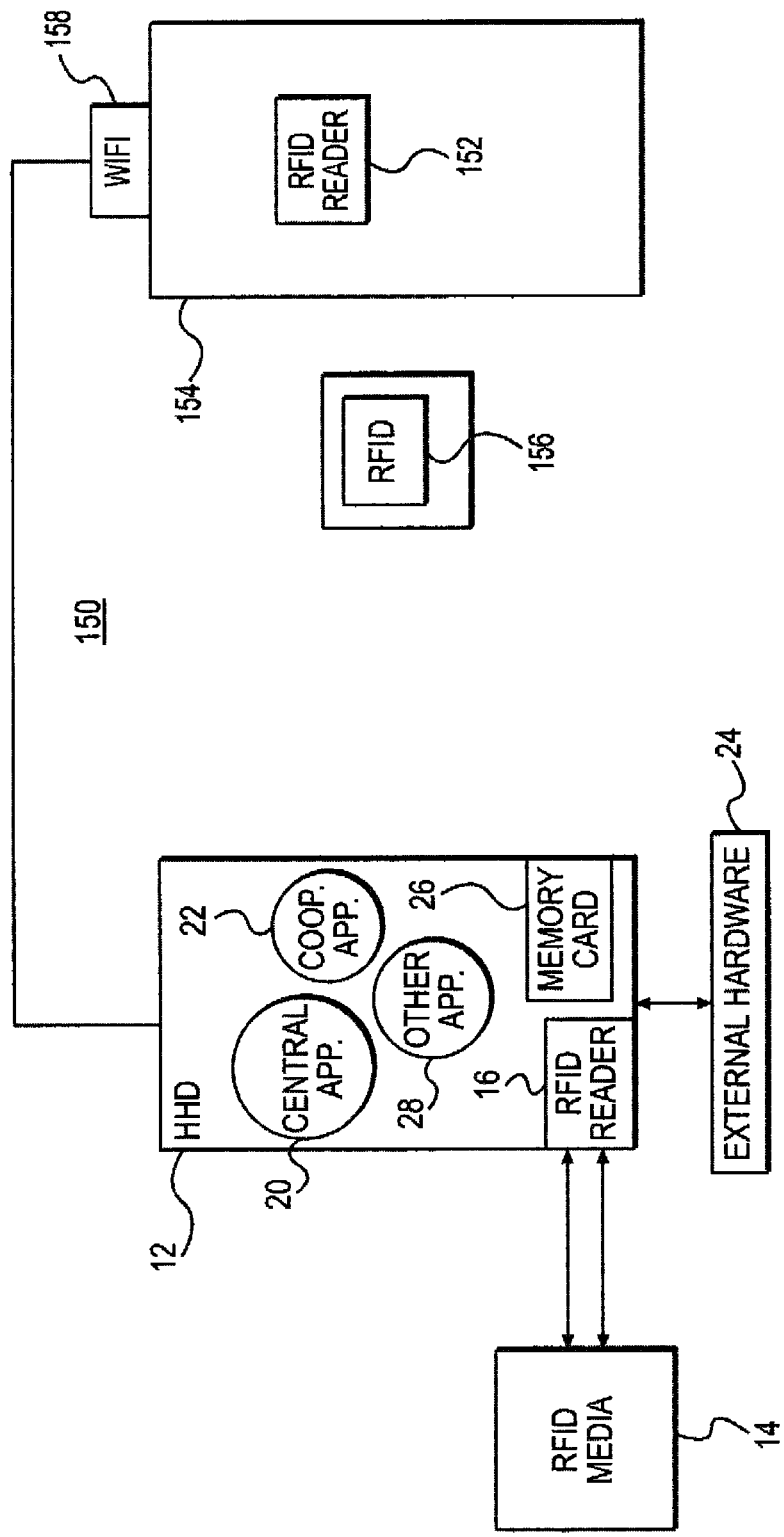
FIG. 4 is a block diagram illustrating an embodiment of a system for interactively interfacing HHDs and RFID media.

With reference now to FIG. 4, shown is an embodiment of system 150 for interactively interfacing handheld device and RFID media as described with reference to method 100 shown in FIG. 3. In embodiment of system 150 shown, RFID reader/interrogator 152 is built-in to refrigerator 154, although principles apply equally to RFID reader/interrogator 152 installed in pantry closet, storage closet, cabinet, etc. RFID reader/interrogator 152 interrogates RFID media (e.g., RFID stickers) 156 on items placed in refrigerator 154. If this is the first interrogation of item, RFID reader/interrogator 152 may time-stamp and/or places unique identifier on RFID media 156 of the item. WiFi transmitter 158 connected or built-in to RFID reader/interrogator 152, transfers information regarding item to HHD 12 (e.g., via peer-to-peer transfer to RFID reader/interrogator in HHD 12. Central application 20 on HHD 12 may process the information as described above. Central application 20 may transfer information to additional HHDs 12' as shown in FIG. 4.

In alternate embodiment, RFID reader/interrogator 152 is part of a computing device, such as computing device (not shown) described above with reference to FIG. 3, which is also installed on or build-in to refrigerator 154 (or, e.g., pantry closet, storage closet, cabinet, etc.). Such computing device may include central application 20 and otherwise be capable of performing functions of HHD 12 described herein. Accordingly, RFID reader/interrogator 152 may simply transfer information regarding item to computing device, e.g., to central application 20 installed in computing device for processing as described above. Central application 20 on computing device may also transfer information to additional HHDs 12'.

With reference again to FIG. 1, in an embodiment, central application 20 provides the necessary overhead, headers, and environment to execute the functions on HHD 12, e.g., commanded by commands on RFID media 14, without having the user addressing all the programming details. For example, iPhones are based on a underlying Unix environment, just as the Macintosh system. This environment is the foundation to the Macintosh computer and the iPhone, iPod, and iPad family of HHD devices. As such, programming in the iPhone is done in Object C that is the foundation to Unix. Object programming, specifically called object-oriented programming (OOP), is a programming paradigm that uses "objects"—i.e., data structures consisting of data fields and methods together with their interactions—to design applications and computer programs. Hence, in Object C, all functions or objects can be written in C, which is a basic programming language.

An issue with any language is to encase the functions that work together in a proper and supportive structure. In an embodiment, a role of central application 20 is to encase the functions that work together on the HHD 12 in a proper and supportive structure. In an embodiment, for every function within central application 20, there is corresponding Object C code. When the functions are strung together with their applicable input and output parameters, central application 20 will take the strung-together functions and parameters and wrap the functions and parameters into an executable program.

With continuing reference to FIG. 1, cooperative applications 22, or other HHDs 12, or peripheral hardware 24 must provide a sound object code with simple and limited input and output parameters. Apple Corp intentionally does not provide a 'Terminal' program that allows access to the Unix operating system within the iPhone or other Apple HHDs, so as to prevent access to operations that could create harm or accidental corruption of the HHD system. Similar HHD manufacturers also may not provide such access. Hence, in embodiments, a role of central application 20 is to allow approved controls to the average user, offered and authorized by Apple or other HHD manufacturers, as well as approved and cooperative controls/functions provided by cooperative applications 22 or hardware interfaces. As noted, this role is not simply limited to Apple and their operating system but includes others such as Symbian, WinMobile, Android, etc.

For example, an embodiment may use an existing and cooperative email application 22, which can share new emails or send out new emails with other applications. At that same time, a cooperative printer application 22 (e.g., Epson iPhone application) can also share functions that allow for printing actions. Being cooperative with central application 20, the email and printer applications 22 can be put together in a short command/code sequence with input/output parameter, and saved to an RFID tag 14 located near the Printer. The later saving to an RFID media 14 may be done by another code sequence saved within central application 20 memory. Accordingly, when HHD 12 comes within range of the RFID tag 14, the RFID tag 14 is read and the command/code sequence on the RFID tag 14 is downloaded and executed. In this case, the executed command/code sequence may cause any new email, based on a time/date stamp as part of the code sequence, to be sent to the printer.

In embodiments described herein, central application 20 gives users control over HHD 12 internal functions and features, as well as, functions and features of cooperative applications 22 and hardware 24. Such commands may be saved internally in HHD 12, but most important they can be saved to external media 14 (e.g., RFIDs, NFCs, FeliCa, etc) for latter recall and use. HHD 12 can then change settings, function, information and processing based on the HHD's 12 location in terms of proximity to these external media 14. Other current products are canned applications that cannot be changed and cannot take advantage of other capabilities provided by third-party applications 24 of HHD 12. Likewise, prior art systems require reference back to a service provider and/or mainframe/server computer to execute changes on HHD 12. Embodiments allow for a simple command codes as functions in one-line or BAT file structures. These codes can be strung together to create simple or complex instructions for HHD 12 or remote devices and can be controlled directly by the end user. Unlike conventional applications that are canned instructions to do specific actions, this string of commands allow a greater or general control of HHD 12. As noted above, basic building blocks of embodiments include a command interpreter, reader interpreter, the cooperative interface to other applications, and memory for the command(s).

As noted above, messages may include virtually any type of information. For example, the information may include patient medical information. Accordingly, when a patient sees a doctor, relevant updated medical information, such as immunization shot records, etc., may be transferred to RFID media 14 (e.g., via peer-to-peer transfer through RFID reader located near RFID media 14) that is conveniently located in the doctor's office. HHD 12 (e.g., central application 20) may encrypt the medical information with a patient identification number (ID) and/or a HHD ID, e.g., as described above, so as to only enable the patient and/or patient guardian to retrieve the information, in order to protect confidentiality of the information. Patients and/or patients' guardians may simply pass their HHD 12 in range of the RFID media 14 to retrieve the relevant medical information. For example, parents of young children have a difficult time keeping track of all their children's immunizations record. When the child's immunization record is updated in the doctor's computer system, a RFID reader may transfer the immunization record to the RFID media 14 in the doctor's office, and then to the parent's HHD 12, or directly to the HHD 12 via peer-to-peer communication between the RFID reader in the doctor's office and RFID reader 16 on HHD 12. Alternatively, parent may simply carry a RFID media card on to which the medical information is transferred by the doctor's office RFID reader. When the parent goes to their house, the medical information can be transferred from HHD 16 (or RFID media 14) to a computer system at home over WiFi or other radiofrequency methods. When a school requests the child's immunization record, the child may take the RFID media card with the immunization record to school, the immunization record may be transferred from the parent's HHD 12 to another RFID media, such as a paper embedded with RFID media, and taken to school, or the information may be otherwise electronically communicated to the school. In the same manner, patients can carry a list of their medications and allergies with them and continuously update them at their doctor's office.

In yet another embodiment, a library utilizes the systems and methods for interactively interfacing handheld device and RFID media. Library books are embedded with RFID tags 14 or other media. When a patron checks out a library book(s), a RFID reader at the library may write the due date and other pertinent information on the RFID tag. The RFID reader may also retrieve the due date and information describing the book(s) from the RFID tag 14 as well as information identifying the patron from the patron's HHD 12. This information is also transferred to the patron's HHD and processed by the HHD 12 (e.g., by the central application 20). The due date for the book(s) may be stored on the HHD 12 (e.g., by the central application 20). At the appropriate time, a due date reminder notice may be displayed on HHD 12 (e.g., by the central application 20), alerting the patron to return the book(s).

In another example, rather than storing messages or numerous commands on RFID media 14, embodiments may be configured so that a command(s) is stored on RFID media 14 that directs HHD 12 (e.g., central application 20) to connect to a cloud computing server to check for and retrieve (e.g., download) messages and/or commands stored on the cloud computing server and intended for the HHD 12. The messages and/or commands may be stored on the cloud computing server via network connections. In this manner, users may "program" RFID media 14 one time with the necessary command(s) for connecting to the cloud computing server and then repeatedly update the stored messages and/or commands on the cloud computing server at the users' convenience (and from any computing device, including another HHD 12, e.g., running central application 20, that can connect to the cloud computing server and transmit messages and/or commands thereto). For example, a wife may "program" an RFID media 14 that is located in her husband's car with command to connect to cloud computing server and check for and retrieve/download messages and/or commands. The wife may leave a message on cloud computing server reminding her husband to pick up dinner. When husband's HHD 12 passes near RFID media 14 in car, the HHD 12 downloads command to connect to cloud computing server, executes the command, connects to the cloud computing server and downloads message. Multiple commands to connect to, check for and retrieve messages and/or commands from cloud computing server(s) may be stored on RFID media 14; such multiple commands may be intended for specific HHDs (and, therefore, coded with HHD IDs so the commands may be read only by the intended HHDs). For example, the wife in the preceding example may "program" RFID media 14 with a command for her husband's HHD 12 to retrieve certain messages and/or commands, another command for her daughter's HHD 12 to retrieve certain messages and/or commands, another command for her son's HHD 12 to retrieve certain messages and/or commands, another command for her housekeeper's HHD 12 to retrieve certain messages and/or commands, and so on. Such commands may connect to the same cloud computing server and simply point to different locations (e.g., folders) thereon, or point to different cloud computing servers.

As noted herein, in addition to encrypting the messages with the unique HHD IDs, commands and messages stored on RFID media 14 may be encrypted by any of a variety of other encryption methods. For example, the central application 20 or other application on HHD 12 may generate encryption for the command or message at the time of generation while interacting with RFID media 14. Likewise, messages and/or commands stored on the cloud server may be encrypted and then decrypted by the appropriate HHD 12.

As can be seen by these examples, the embodiments described herein may be used for a large variety of purposes and implementations. As is also illustrated, RFID media 14 need not be stationary but may be used as a portable information storage that may be read from or written to by HHDs 12 and other RFID readers. For example, in another embodiment, users may carry RFID media 14 (alternatively, RFID media 14 may even be implanted into user's skin) that includes information relevant to user, such as security clearance, access rights, identifying information, ticket information (section/row, etc.) or other relevant information. Such information may be written to RFID media 14 by a HHD 12 or other RFID reader. When user enters or attempts to enter a secured area (e.g., building or room), a limited access area, an event arena or theater, etc., a HHD 12 or other RFID reader may interrogate the user's RFID media 14 and determine whether the user is entitled to entry. The HHD 12 or other RFID reader may time-stamp the user's RFID media or otherwise store a message on the RFID media indicating, e.g., when the user entered or attempted to enter, how many additional entries the user is entitled to, if any, how long the user is entitled to stay in the area, etc. In this manner, RFID media may act as a flexible and re-writable security or access pass or ticket for user and enable user's user thereof to be regulated and monitored.

In another embodiment, RFID media 14 (e.g., in the form of a RFID tag) may be affixed on a HHD charger, such as a car charger. The RFID media 14 may be affixed by a user or built-in the charger by the manufacturer. Likewise, RFID media 14 may be pre-programmed (e.g., commands and/or messages pre-written on RFID media 14) or customized by the user. This RFID media 14 may have car setting-specific commands, such as turning on HHD 12 blue-tooth functions, turning off HHD 12 WiFi reception or broadcast capabilities, turning on HHD 12 GPS functions, etc. Likewise, a RFID media 14 with commands for specific settings for an office environment, such as placing HHD 12 phone on silent mode or causing HHD 12 phone to forward calls to desktop phone may be placed on a charger at the office.

In an embodiment involving point-of-sale (POS) at retail establishments, including restaurants, coffee shops, book stores, cafes and others, HHD 12 may be used to make purchases rather than using cash or a credit card. The retail establishment may provide rewards or services via RFID media 14. For example, retail establishments that provide WiFi to customers may provide commands and/or messages via RFID media 14. Hence, at the time of a sales transaction, HHD 12 may interrogate a retail establishment's POS sales device which has built-in RFID capabilities and retrieve/ download commands and/or messages from the establishment's device. RFID media 14 may also be swiped by user's HHD 12 when a user makes a purchase. The RFID media 14 may be physically presented to the user so user can bring the user's HHD 12 in close proximity to the RFID media 14. In an embodiment, the RFID media 14 is a disposable passive RFID media 14 that is embedded into the paper receipt handed to the user. Alternatively, disposable RFID media 14 may be affixed to the product purchased by the user (e.g., a coffee cup, plate, food wrapper, etc.). In another embodiment, a key for accessing the commands or messages on the RFID media 14 may be provided to the user, e.g., as a bar code readable by HHD 12 bar-code reader on the receipt. The key may be used to decrypt or otherwise commands or messages stored on the RFID media 14, which itself may be a fixed RFID media 14 located in the retail establishment. The commands or messages may include a secure password and/or key for accessing the WiFi and/or a command to turn on the WiFi functions. Alternatively, the commands or messages may cause the HHD 12 web browser to open and connect to a webpage that provides offers (e.g., discounts, coupons, etc.) or other information to the user. Other information and commands may be provided by the retail establishment RFID media 14.

In yet other embodiments, RFID interrogators may be built into additional devices and paired with processors enabling the reading and execution of commands and messages from RFID media passed within range. In this manner, settings of the devices may be set, updated, or restored using RFID media. For example, car radios may include built-in RFID interrogators so that RFID media could be used to set the car radio settings. Among the settings that could be stored for a car radio include: screen display settings—graphics, color, video, touch interfaces; dual zone mode—to address radio reception in more than one area; AUX input—audio input from external sources, no control; A/V inputs; A/V outputs; USB inputs—rear and front; iPod/iPhone interface—control via proprietary cable or via the USB port; Pandora connectivity; Bluetooth; navigation; satellite radio—Sirius, XM and now SiriusXM; HD reception; steering wheel control settings; voice control settings; music input read formats—MP3, WMA, AAC, etc.; and security features—removable face plate and PIN number to reduce radio theft. A user could store radio settings on RFID media, using the above-described HHD 12 embodiments to create and store the necessary commands and messages on the RFID media. Alternatively, the radio settings could be stored in the HHD 12 memory (or RFID media built-in to HHD 12) and communicated to the radio directly, e.g., through a standard "hand-shake" routine used to "connect" two HHDs together, blue-tooth or other means of communication (or by the radio's RFID interrogator). In an embodiment, the car radio could pair with the HHD 12 to perform the above functions, where the radio acts as another HHD. In this manner, a car radio settings may be restored after a power failure of the car radio, set upon first use or updated at later times.

In another embodiment, RFID media 14 is affixed to soldiers and other military personnel. The RFID media 14 may be placed on the soldiers or surgically placed or otherwise inserted under their skin. Information relevant to the soldiers may be stored on the RFID media 14. This information may contain pertinent and life saving information such as allergies, prior surgical history, medications that the soldier is taking, as well as identification information. This information is vital in the military theatre where the soldier may be injured and is unresponsive and communication is lost with the home base. The current art has RFID tags embedded with identifiers that have to be searched for in a server to identify the soldier and his/her information. However, often times in military combat, this is not possible due to loss of communication or the unavailability of necessary equipment. By having the information directly on the soldier, a HHD such as HHD 12 may interrogate and retrieve the appropriate and potentially life saving information from the RFID media 14 affixed to the soldier. The information on the RFID media 14 may be encrypted or otherwise secured (e.g., with HHD 12 ID) to prevent enemy forces or unauthorized personnel from obtaining the information.

With reference now to FIG. 5, shown is a block diagram illustrating exemplary hardware components 400 for implementing embodiments of system and method for interactively interfacing handheld device and RFID media. HHD 12, or other device similarly configured, may include and execute one or more applications, including central application 20, to perform functions described herein, including steps of method 50 and method 100 described above. HHD 12 may connect with network 402, e.g., wireless telecommunication network, Internet, or other network, to transmit and receive information, commands, messages, etc. as described above.

HHD 12 may include a memory 404 and a processor 406. HHD 12 may also include an input device 408, a display device 410, an output device 412, and one or more antennas/transmitters 414/416. Memory 404 may include RAM or similar types of memory, and it may store one or more applications for execution by processor 406. Processor 406 executes the application(s), such as central application 20, cooperative applications 22 or other applications 28, which are stored in memory 404, or received from the Internet or other network 402. The processing by processor 406 may be implemented in software, such as software modules, for execution by computers or other machines. These applications preferably include instructions executable to perform the system and methods described above and illustrated in the drawings herein. The applications preferably provide graphical user interfaces (GUIs) through which users may view and interact with central application 20 and RFID media 14.

HHD 12 may store one or more database structures in memory 404, for example, for storing and maintaining information necessary to perform the above-described methods, such as commands, command sets, messages, shopping lists, etc. Alternatively, such databases may be in storage devices separate from HHD 12.

Also, as noted, processor 406 may execute one or more software applications in order to provide the functions described in this specification, specifically to execute and perform the steps and functions in the methods described above. Such methods and the processing may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the system.

Input device 408 may include any device for entering information into HHD 12, such as a touch-screen, keyboard, mouse, cursor-control device, touch-screen, microphone, digital camera, video recorder, etc. The input device 408 may be used to enter information into GUIs during performance of the methods described above. Display device 410 may include any type of device for presenting visual information such as, for example, a typical HHD screen. Output device 412 may include speakers or any device for providing information in audio form.

Antenna/transmitter 414/416 may include one or more antennas/transmitters or like devices for connecting to, transmitting to and receiving from a telecommunication network, such as CDMA or GSM mobile network 402. Likewise, antenna/transmitter 414/416 may also include WiFi or other antenna/transmitters for connecting to, transmitting to and receiving from other wireless networks 402 or other HHDs 418 (through peer-to-peer or via other networks 402).

Although only one HHD 12 is shown in detail, embodiments may use multiple HHDs 418 as necessary. HHDs 418 may be connected 420 to network 402. In addition, although HHD 12 is depicted with various components, one skilled in the art will appreciate that the server can contain additional or different components. In addition, although aspects of an implementation consistent with the above are described as being stored in memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling HHD 12, to perform a particular method, such as methods described above.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A method for interactively interfacing mobile telephony devices and radio frequency identification (RFID) media, comprising:
    starting an application on a mobile telephony device having a unique identifier for interfacing with RFID media, wherein the mobile telephony device includes a RFID reader and the mobile telephony device is capable of transmitting and receiving via telecommunication networks;
    receiving user input relating to the creating and storing of one or more commands on RFID media;
    creating on the mobile telephony device the one or more commands based on the received user input, wherein:
        the one or more commands instruct mobile telephony devices to perform one or more functions when the one or more commands are read from a RFID media and executed by mobile telephony devices;
        the one or more commands include mobile telephone operating system commands that may be executed by an operating system running on mobile telephony devices; and
        the one or more functions performed by the mobile telephony devices include sending one or more commands, messages or signals to one or more devices external to, detached from, and remote from the mobile telephony devices and the RFID media;
        the one or more commands correspond to a specific mobile telephony device so that only the corresponding mobile telephony device executes the one or more commands;
        the one or more commands are encrypted using the unique identifier of the mobile telephony device; and
    storing the one or more commands on a RFID media using the RFID reader, wherein the storing includes the RFID reader transmitting the one or more commands to the RFID media.

2. The method of claim 1 further comprising storing one or more mobile telephony device IDs with the one or more commands on the RFID.

3. The method of claim 1 wherein the mobile telephony device is a first mobile telephony device, the method further comprising interrogating the RFID media with a RFID reader on second mobile telephony device.

4. The method of claim 3 further comprising the second mobile telephony device receiving the one or more commands from the interrogated RFID media.

5. The method of claim 4 further comprising the second mobile telephony device processing the received one or more commands.

6. The method of claim 5 wherein the processing includes determining if the one or more commands are intended for the second mobile telephony device.

7. The method of claim 5 wherein the processing of the one or more commands comprises executing the one or more commands and performing one or more functions per the one or more created commands.

8. The method of claim 7 wherein performing the one or more functions include transmitting one or more signals from the second mobile telephony device to one or more other devices.

9. The method of claim 8 wherein the one or more other devices include a television and the signals instruct the television to turn on.

10. The method of claim 8 wherein the one or more other devices include an alarm system and the signals instruct the alarm system to turn off.

11. The method of claim 8 wherein the one or more other devices include a lighting control system and the signals instruct the lighting control system to turn on lights.

12. The method of claim 7 wherein performing the one or more functions include disabling features on the second mobile telephony device.

13. The method of claim 7 wherein performing one or more functions include enabling features on the second mobile telephony device.

14. The method of claim 5 further comprising receiving user inputs to edit, replace or delete the one or more commands.

15. The method of claim 14 further comprising editing, replacing or deleting the one or more commands.

16. The method of claim 1 wherein the one or more commands include object code.

17. The method of claim 1 wherein the one or more commands include operating system commands that may be executed by an operating system running on the mobile telephony device.

18. The method of claim 1 wherein the one or more commands include a command instructing a mobile telephony device to connect to a cloud computing server.

19. The method of claim 1, further comprising:
    passing the mobile telephony device within range of the RFID media;
    interrogating the RFID media with the RFID reader;
    receiving, on the mobile telephony device, the one or more commands from the RFID media; and
    the mobile telephony device executing the one or more commands, wherein the executing the one or more commands causes the mobile telephony device to execute one or more functions.

20. The method of claim 19 wherein the mobile telephony device determines the one or more functions to execute directly from the one or more commands.

21. The method of claim 1 wherein the one or more commands may be executed by an mobile telephony device without requiring the mobile telephony device to look up the one or more functions.

22. The method of claim 1 wherein the one or more commands may be executed by an mobile telephony device without requiring the mobile telephony device to access a remote server.

23. A method for interactively interfacing handheld devices (HHDs) and radio frequency identification (RFID) media, comprising:
    starting an application on a computing device having a unique identifier for interfacing with RFID media, wherein the computing device includes a built-in RFID reader and the computing device is capable of transmitting and receiving data via telecommunication networks;

receiving user input on the computing device, wherein the user input is entered directly into the computing device and causes the computing device to create one or more commands and store the one or more commands on RFID media;

creating the one or more commands on the computing device based on the received user input, wherein the one or more created commands are executable commands that instruct HHDs to perform one or more functions when the one or more commands are read from a RFID media and executed by HHDs, wherein the one or more commands are directly executed by HHDs without the HHDs interacting with an external computing device; and the computing device storing the one or more created commands on a RFID media using the RFID reader, wherein the storing includes the RFID reader transmitting the one or more created commands directly to the RFID media without the computing device interacting with an external computing device, wherein the one or more commands correspond to a specific computing device so that only the corresponding computing device executes the one or more commands, wherein the one or more commands are encrypted using the unique identifier of the computing device.

24. A method for interactively interfacing handheld devices (HHDs) and radio frequency identification (RFID) media, comprising:

starting an application on a computing device having a unique identifier for interfacing with a RFID media, wherein the computing device includes a RFID reader and the application provides a user interface for receiving user input on the computing device;

receiving user input entered directly into the user interface on the computing device that specifies one or more functions that are to be performed when HHDs pass near the RFID media wherein the received user input causes the computing device to create one or more executable commands corresponding to the specified functions and store the one or more executable commands on the RFID media and wherein the one or more functions may include operating HHD features, executing HHD applications, or transmitting commands to external items;

translating the specified one or more functions into the one or more executable commands that are executable by HHDs, wherein the one or more executable commands are read by HHDs and executed by HHDs to cause HHDs to perform the specified one or more functions when HHDs passes near the RFID media; and the computing device directly transmitting and storing the one or more executable commands on the RFID media using the RFID reader, wherein the one or more commands correspond to a specific computing device so that only the corresponding computing device executes the one or more commands, wherein the one or more commands are encrypted using the unique identifier of the computing device.

* * * * *